US011257340B2

(12) United States Patent
Fairweather et al.

(10) Patent No.: US 11,257,340 B2
(45) Date of Patent: Feb. 22, 2022

(54) WORK ZONE INTRUSION ALERT SYSTEM

(71) Applicant: FirstEnergy Corp., Akron, OH (US)

(72) Inventors: William Fairweather, Wooster, OH (US); Nicholas E. Stanca, Westlake, OH (US); Robert Soreo, Cleveland Heights, OH (US); Jason Grant Tilk, Cleveland Heights, OH (US); David J. Boll, Avon, OH (US); Roy Stevens, Hudson, OH (US); Kyle Sams, Stow, OH (US)

(73) Assignee: FirstEnergy Corp., Akron, OH (US)

( * ) Notice: Subject to any disclaimer, the term of this patent is extended or adjusted under 35 U.S.C. 154(b) by 0 days.

(21) Appl. No.: 17/089,087

(22) Filed: Nov. 4, 2020

(65) Prior Publication Data

US 2021/0065530 A1    Mar. 4, 2021

Related U.S. Application Data

(63) Continuation-in-part of application No. 16/278,990, filed on Feb. 19, 2019, now abandoned.
(Continued)

(51) Int. Cl.
*G08B 13/24* (2006.01)
*G01S 13/56* (2006.01)
(Continued)

(52) U.S. Cl.
CPC .......... *G08B 13/2494* (2013.01); *E01F 9/654* (2016.02); *G01S 13/56* (2013.01);
(Continued)

(58) Field of Classification Search
CPC ........ G08B 13/2494; G08B 6/00; G08B 7/06; G01S 13/56; G01S 13/886; H04W 4/021; H04W 84/18; E01F 9/654
(Continued)

(56) References Cited

U.S. PATENT DOCUMENTS

| 5,552,767 A | 9/1996 | Toman |
| 5,661,474 A | 8/1997 | Douglas |

(Continued)

FOREIGN PATENT DOCUMENTS

CN    205259081 U    5/2016

OTHER PUBLICATIONS

International Search Report and Written Opinion of the International Searching Authority for corresponding PCT/US2019/018476, dated Apr. 30, 2019, 19 pages.

*Primary Examiner* — John A Tweel, Jr.
(74) *Attorney, Agent, or Firm* — Tucker Ellis LLP; Heather M. Barnes; Michael G. Craig

(57) ABSTRACT

One or more techniques and/or systems are disclosed for alerting workers in a work zone of a potential intrusion by a vehicle. The example system can comprise a detection unit operable to mount to a work zone boundary marker. The detection unit monitors the work zone for intrusion by moving objects using the Doppler Effect. The detection unit can transmit an alarm signal to one or more personnel alerters, such as worn by workers. The personnel alerters can receive the alarm signal and activate an alert, such as an audible, visual, or other sensory alert. In this way, an alert is provided to personnel working in an established work zone that a moving object, such as a vehicle, has penetrated the work zone perimeter. This type of alert may provide the personnel the vital seconds needed to move to safety.

20 Claims, 32 Drawing Sheets

Related U.S. Application Data

(60) Provisional application No. 62/631,525, filed on Feb. 16, 2018, provisional application No. 63/029,844, filed on May 26, 2020.

(51) Int. Cl.
| | | |
|---|---|---|
| *E01F 9/654* | (2016.01) | |
| *H04W 4/021* | (2018.01) | |
| *G08B 6/00* | (2006.01) | |
| *G01S 13/88* | (2006.01) | |
| *G08B 7/06* | (2006.01) | |
| *H04W 84/18* | (2009.01) | |

(52) U.S. Cl.
CPC .............. *G01S 13/886* (2013.01); *G08B 6/00* (2013.01); *G08B 7/06* (2013.01); *H04W 4/021* (2013.01); *H04W 84/18* (2013.01)

(58) Field of Classification Search
USPC ........................................................ 340/541
See application file for complete search history.

(56) References Cited

U.S. PATENT DOCUMENTS

| | | |
|---|---|---|
| 5,755,174 A | 5/1998 | Freeman |
| 5,760,686 A | 6/1998 | Toman |
| 6,288,651 B1 | 9/2001 | Souza |
| 6,512,451 B1 * | 1/2003 | Eslambolchi ........... E01F 9/688 340/425.5 |
| 7,030,777 B1 | 4/2006 | Nelson et al. |
| 8,237,555 B2 * | 8/2012 | McCarthy ................ G08G 1/01 340/435 |
| 9,024,758 B2 | 5/2015 | Bushee |
| 9,940,799 B2 | 4/2018 | Kemp et al. |
| 9,987,981 B1 * | 6/2018 | Deyaf .................... B60Q 5/006 |
| 10,237,900 B2 * | 3/2019 | Jackson ................ H04W 76/10 |
| 11,030,875 B2 * | 6/2021 | Glynn ................ G08B 21/0469 |

* cited by examiner

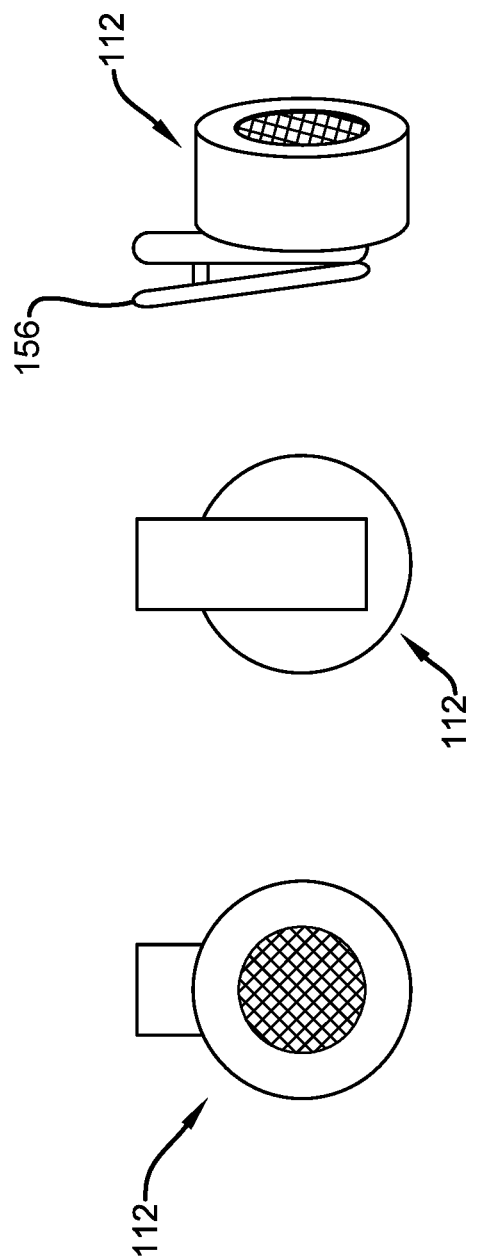

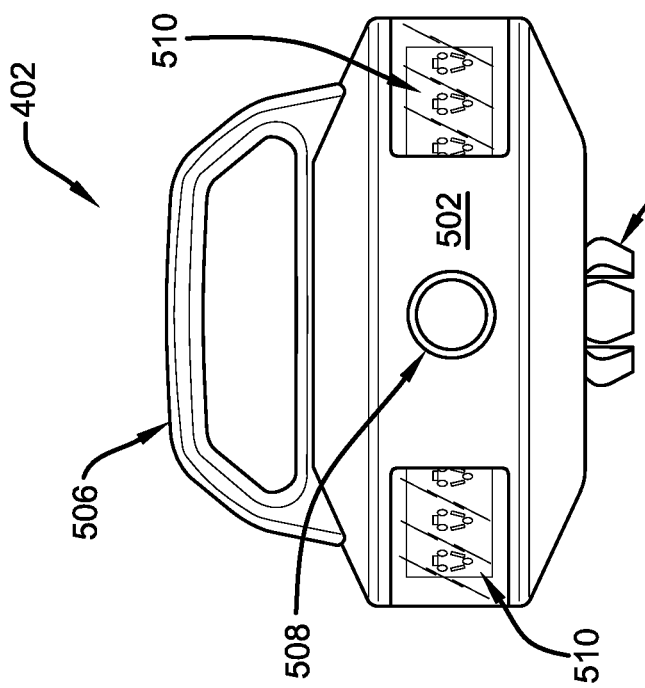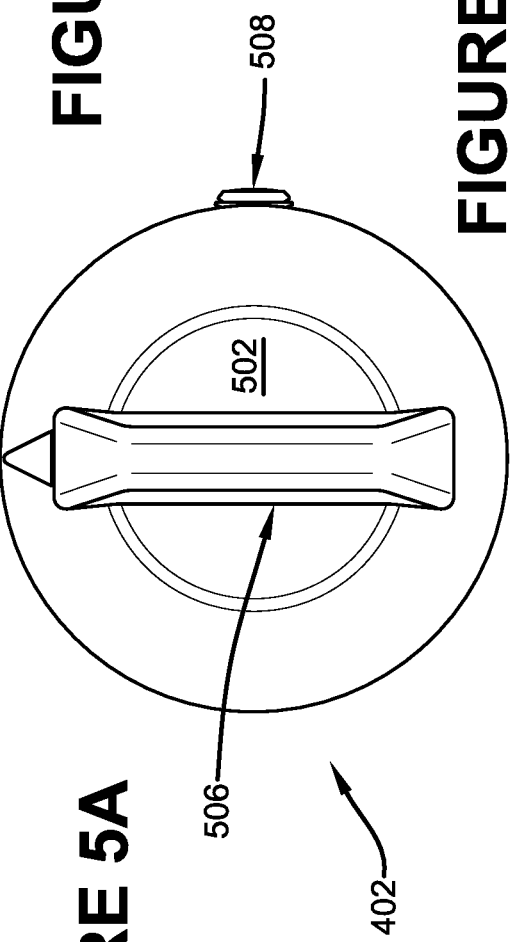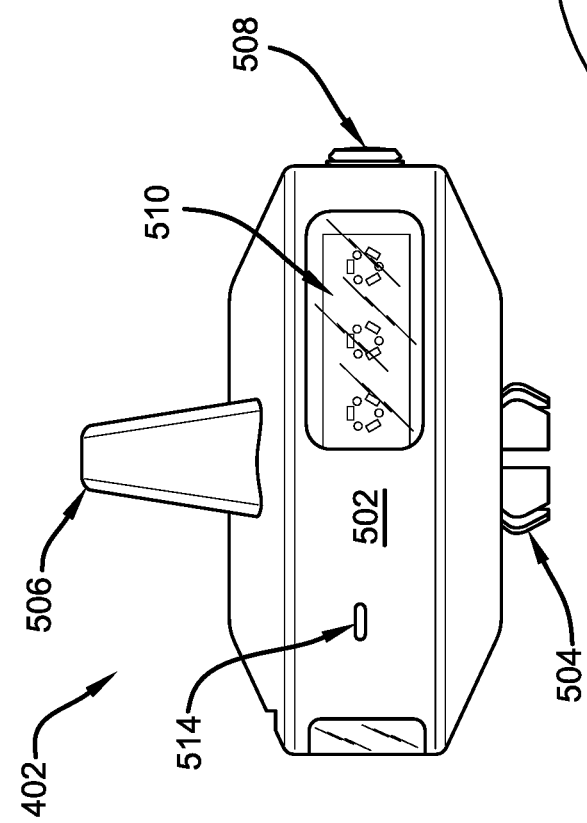

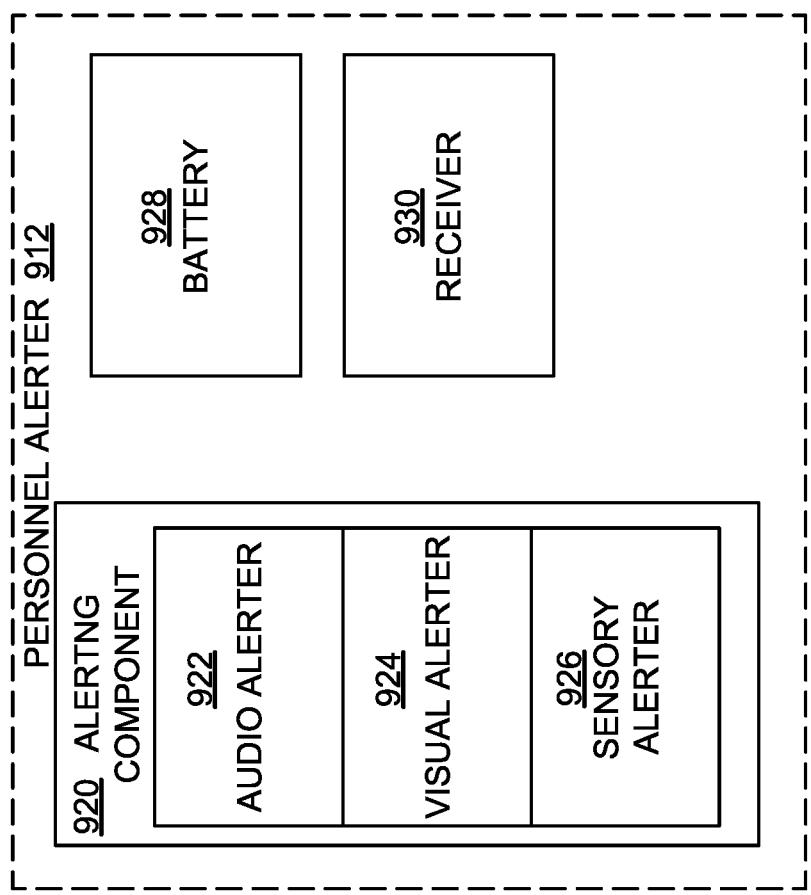

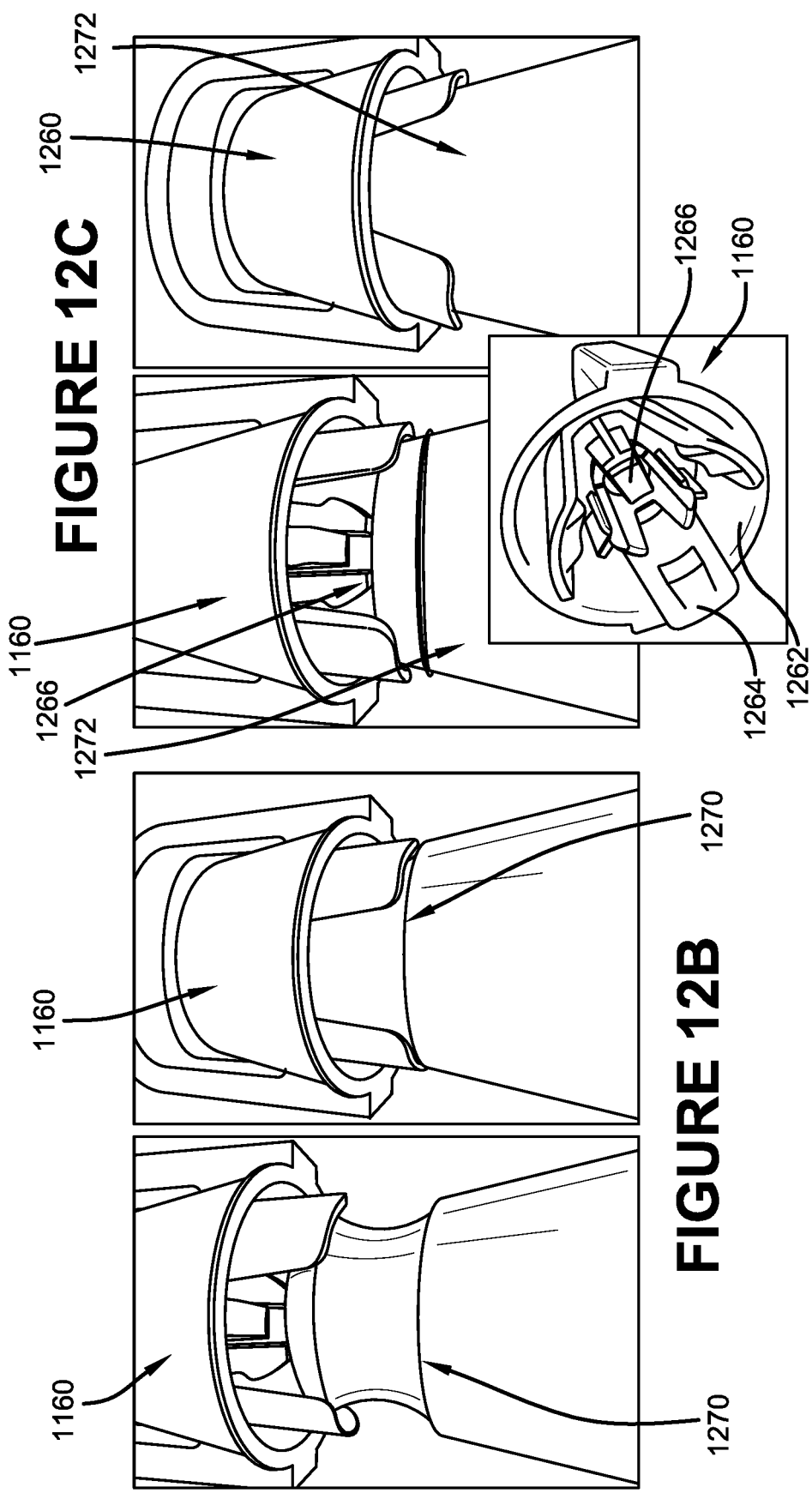

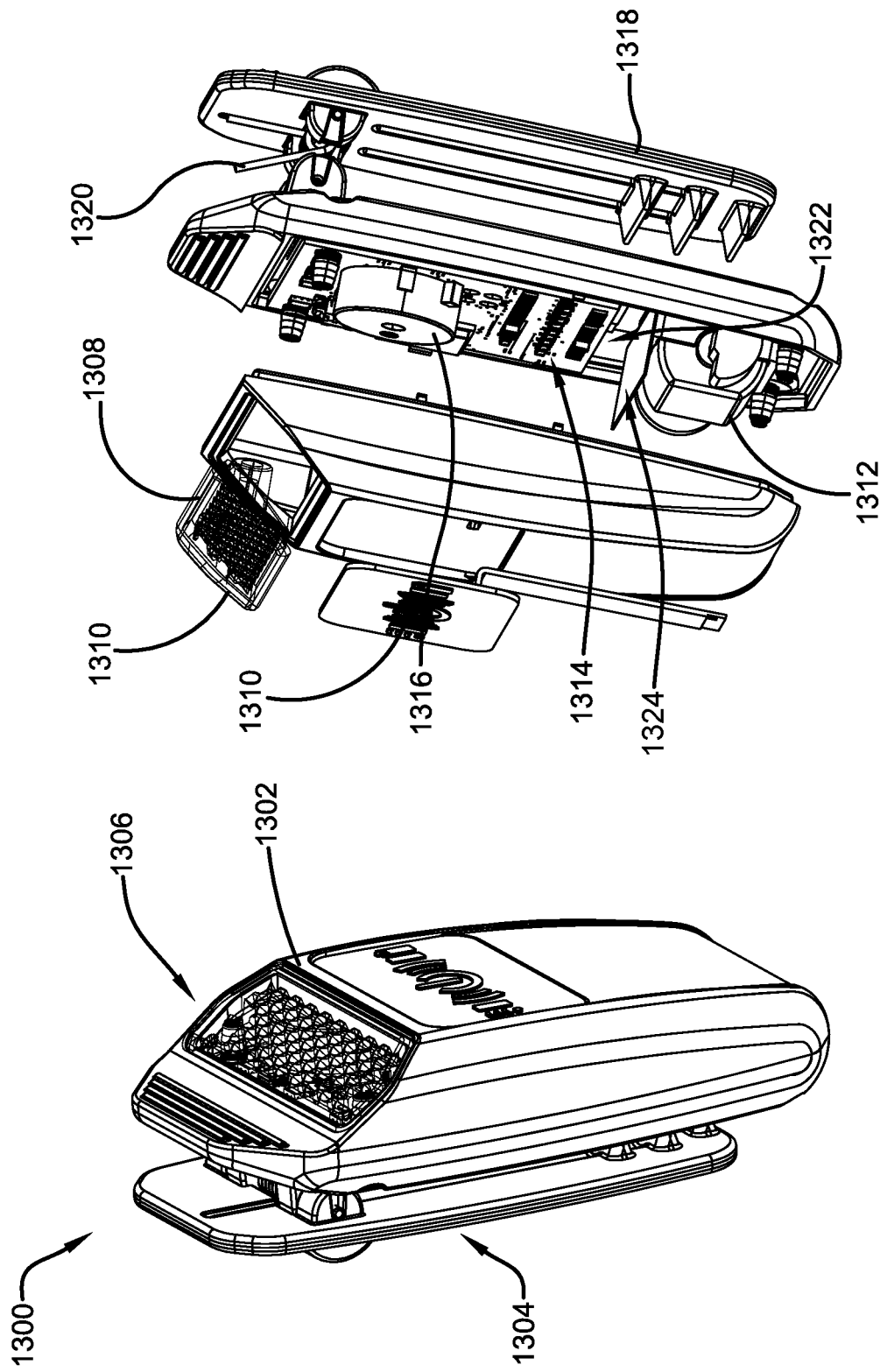

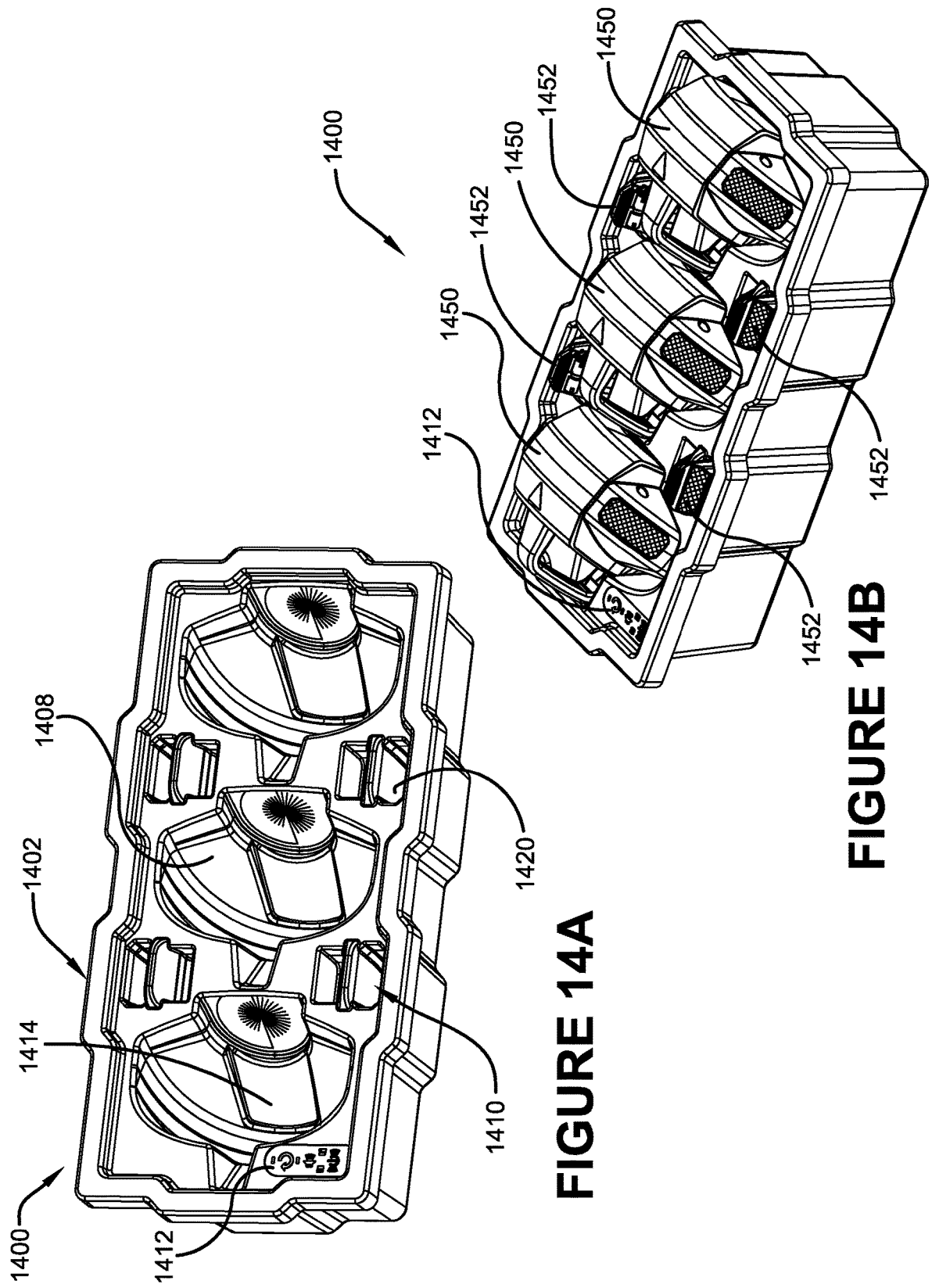

WORK ZONE INTRUSION ALERT SYSTEM

CROSS-REFERENCE TO RELATED APPLICATIONS

This application is a continuation-in-part patent application of U.S. patent application Ser. No. 16/278,990, entitled WORK ZONE INTRUSION ALERT SYSTEM, filed Feb. 19, 2019, and claims priority to U.S. Ser. No. 62/631,525, entitled WORK ZONE INTRUSION ALERT SYSTEM, filed Feb. 16, 2018; and claims priority to U.S. Ser. No. 63/029,844, entitled WORK ZONE INTRUSION ALERT SYSTEM, filed May 26, 2020, all of which are incorporated herein by reference in their entirety.

BACKGROUND

Work zone safety may be important for personnel working in areas subject to vehicle traffic, such as on roadways, industrial throughways, and other areas. Some systems can alert workers when an unauthorized vehicle enters the work zone. Existing devices may utilize some of the following methods to provide an alert to a worker; 1) a compressed $CO_2$ canister, 2) wireless network communication, and 3) air compression hoses linked to portable vibration alert devices that are worn by the workers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to provide an alert to one or more workers in a work zone of a potential intrusion by a vehicle. For example, by providing an alert, such as an audible, visible, or sensory alert, in one or more locations, the work zone intrusion alert system, described herein, can alert personnel working in an established work zone that an unauthorized vehicle has penetrated the work zone perimeter. This type of alert may provide the personnel time to move out of the way of the vehicle. For example, the system can be deployed in frequently moving, or temporary work zones, where safety barriers may not be a viable option, such as where a vehicle lane closure is undertaken.

In one implementation of a system for alerting personnel proximate a work zone to a work zone intrusion, a detection unit is mounted to a work zone boundary marker. The detection unit can be used to monitor the work zone for intrusion by moving objects, and the detection unit includes at least one sensor housed in the detection unit. The at least one sensor can be used to detect a moving object in the vicinity of the work zone using the Doppler Effect. The system includes a personnel alerter configured to activate an alert and a base station configured and adapted to charge and store the personnel alerter and the detection unit. The detection unit can broadcast an alarm signal that is received by the personnel alerter, such as when the at least one sensor of the detection unit detects a moving object in the vicinity of the work zone.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 1A and 1B are component diagrams illustrating one implementation of an exemplary system 100 for providing a work zone intrusion alert.

FIGS. 5A through 5H are component diagrams illustrating one or more portions of one or more components of an example detection unit.

FIG. 9 is a schematic diagram illustrating an implementation of example components of a system described herein.

FIGS. 12A through 12C are component diagrams illustrating an alternate implementation of one or more portions of one or more components of an example detection unit.

FIGS. 13A and 13B are component diagrams illustrating one alternate implementation of an example personnel alerter of the exemplary system.

FIGS. 14A through 14C are component diagrams illustrating an alternate implementation of one or more portions of one or more components of an example base station.

DETAILED DESCRIPTION

Figure 1A:
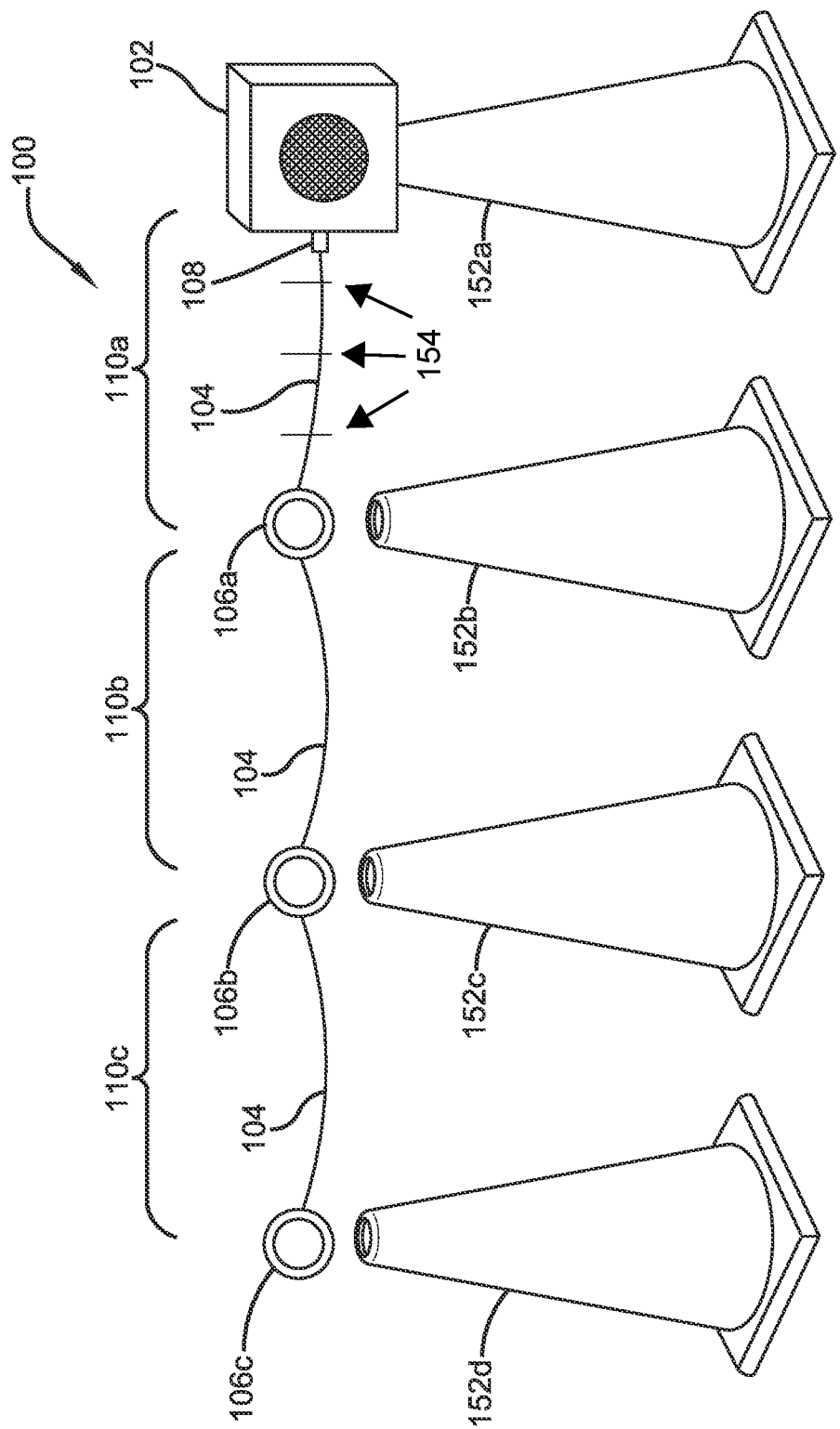

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a temporary work environment, such as one that may be moved periodically (e.g., on a roadway), may not allow for the use of physical barriers to mitigate intrusion by vehicles (e.g., concrete barriers) to protect workers from vehicles that may breach a work zone's perimeter. Often, the workers utilize a set of one or more temporary boundary markers (e.g., cones, barrels, etc.), or the like, to demarcate the work zone, which merely provide a visual indication of a barrier, and provide little physical protection from intruding vehicles, for example. A system may be devised for providing a work zone intrusion alert, which may provide advanced warning of work-zone intrusion in these types of situations, while also being convenient and easy to use. As an example, when a vehicle crosses a traffic boundary marker perimeter, the system can activate an intrusion alert that provides an alert (e.g., audible, visual, sensory) at one or more appropriate locations. In this example, this type of advanced notice may give the workers the added time to take action with regard to the intruding vehicle.

In another aspect, the system provides one or more sensors adapted to detect and alert personnel in a work zone, such as a construction site, of an imminent intrusion. The various types of intrusions may include moving vehicles near a defined work zone, such as, for example, during highway maintenance or on construction sites.

FIGS. 1A and 1B are component diagrams of one implementation of an exemplary system 100 for providing a work zone intrusion alert. In this implementation, the exemplary system 100 can comprise a master device 102. The master device can comprise a housing configured to house components of the master device 102, internally (e.g., protection from environment, impact, etc.). The master device 102 housing can be configured to be mounted on a traffic boundary marker 152, for example, such as one that is disposed farthest from the work zone, and closest to potentially intruding vehicles. As an example, the master device 102 housing can comprise a feature (e.g., cavity or indentation) that allows it to be engaged with a work zone boundary marker, such as a cone, barrel, upright, post, pole, etc. As another example, the master device can comprise an engaging component, such as a clip, projection, clasp, or some type of fastening device that allows it to be selectably engaged with a work zone boundary marker.

As illustrated in FIG. 1A, the exemplary system 100 can comprise a tripwire 104 (e.g., cable, wire, rope, chain, etc.). In one implementation, the tripwire 104 can be strung from boundary marker to boundary marker, where the tripwire 104 can serve as a sort of detection barrier to cover the spaces between respective work zone boundary markers 152. In one implementation, the tripwire 104 may comprise a coupler 108 that is configured to operably, selectably engage with the master device 102. That is, for example, the coupler 108 is disposed at a coupler end of the tripwire 104, and selectably engages with the master device 102 during operation of a work zone intrusion alert system.

As an example, the coupler 108 can engage with master device 102 by coupling with a connection (216, FIG. 2A) in the master device 102. An example of the coupler engaging the master device can comprise inserting the coupler 108 in the connection 216, magnetically coupling the coupler 108 with the connection 216, otherwise coupling the coupler 108 with the connection 216 such that the coupler 108 stays in place during normal operation of the system, but disengages from the master device 102 (e.g., from the connection 216) under a pre-determined load applied to the coupler 108. For example, a pre-determined force applied to the tripwire 104 can apply that force to the coupler 108, which can disengage the coupler from the master device 102.

In one implementation, the master device 102 can be configured to detect when the coupler 108 is disengaged from the connection 216. For example, when operably engaged, the coupler 108 may hold a switch in an open position, and when the coupler is disengaged the switch may default to a closed position, which can provide for detection of the coupler 108 disengaging from the connection 216. As another example, breaking of a magnetic coupling may activate a signal that indicates the coupler 108 disengaging from the connection 216. It should be appreciated that it is anticipated that there are several ways to detect decoupling of one component from another.

As an illustrative example, the tripwire 104 is operably, selectably engaged with the master device 102 using the coupler 108. In this example, when the tripwire 104 is impacted and pulled by a vehicle that crosses the work zone boundary, the coupler 108 can be disengaged from the master device 102, which can result in an activation the system to provide an alert.

Further, as shown in FIG. 1A, the exemplary system 100 can comprise one or more boundary marker engaging components 106, such as a first boundary marker engaging component 106a, a second boundary marker engaging component 106b, a third boundary marker engaging component 106c (e.g., and so-on). In one implementation, the respective boundary marker engaging components 106 can be configured to operably, selectably engage with a work zone boundary marker 152. That is, for example, the first boundary marker engaging component 106a can selectably engage with a second work zone boundary marker 152b; the second boundary marker engaging component 106b can selectably engage with a third work zone boundary marker 152c; the third boundary marker engaging component 106c can selectably engage with a fourth work zone boundary marker 152d (e.g., and so-on). It should be appreciated that the work zone intrusion system may merely comprise the first boundary marker engaging component 106a that engages with the second work zone boundary marker 152b; or may comprise the first and the second boundary marker engaging component 106b engaging with the third work zone boundary marker 152c (e.g., or the third, fourth, etc.). That is, the example, system can be scalable to comprise a desired number of boundary markers, selected for an expected work zone boundary size, shape, and or desired distance between boundary markers.

As one example, the boundary marker engaging components 106 may comprise cone mountable rings, that are selectably engagable in an operably, fixed engagement (e.g., or integrated) with the tripwire 104, and attach (e.g., slide on) to the respective boundary markers 152. In this way, for example, the boundary marker engaging components 106 can be used to engage the tripwire 104 with the respective boundary markers 152. For example, the tripwire 104 can comprise segments that are attached to boundary marker engaging components 106, in a chain, with respective boundary marker engaging components 106 selectably engaged with a boundary marker 152, to form a physically demarcated boundary of the work zone. Additionally, as illustrated in FIG. 1A, and described above, at least one of the segments of the tripwire 104 can be selectably, operably coupled with the master device 102 using the coupler 108. In that way, for example, when one of the boundary markers 152 are displaced (e.g., or the tripwire 104 is displaced), such as by an impact, the tripwire 104 can be disengaged from the master device 102 to activate the alert system.

In one implementation, as illustrated in FIG. 1A, the exemplary system may comprise one or more measuring increments 154, disposed on the tripwire 104 (e.g., marked by color or other marking on the tripwire). In one implementation, the measuring increments 154 may assist a worker during a set-up process, by helping them identify an appropriate distance between boundary markers 152, for example, determined by the roadway's posted speed limit. For example, the distance may be specified by some regulatory agency, policy or other appropriate engineering factors (e.g., by the U.S. Department of Transportation (USDOT), Ohio Department of Transportation (ODOT), Occupational Safety and Health Administration (OSHA)).

In one implementation, the respective sections of the tripwire 104 can comprise a pre-determined, specified distance, for example, appropriate for a particular use. That is, for example, a first distance 110a can comprise the distance from the coupler 108 to the first boundary marker engaging component 106a on the tripwire. Further, a second distance 110b can comprise the distance between the first boundary marker engaging component 106a and the second boundary marker engaging component 106b on the tripwire 104 (e.g., and so-on for a third distance 110c, etc.).

As illustrated in FIG. 1B, the exemplary system 100 of can comprise one or more portable alerters 112 (e.g., portable alarm). In one implementation, the device may be small enough to be effectively worn on, and/or used by, personnel in the work zone, such as on a belt or clothing of a worker. In one implementation, the portable alerter 112 can comprise an engagement component 156, such as a clip or other temporary engaging component, or can be placed in a convenient location in the work zone. As an example, when the portable alerter 112 receives a wireless alert signal from the master device 102, it can activate an alert (e.g., audible, visual, sensory), by using an audible speaker (e.g., or strobe, vibration, or other alert), for example, to alert proximate personnel of a potential work zone intrusion.

Figure 2A:
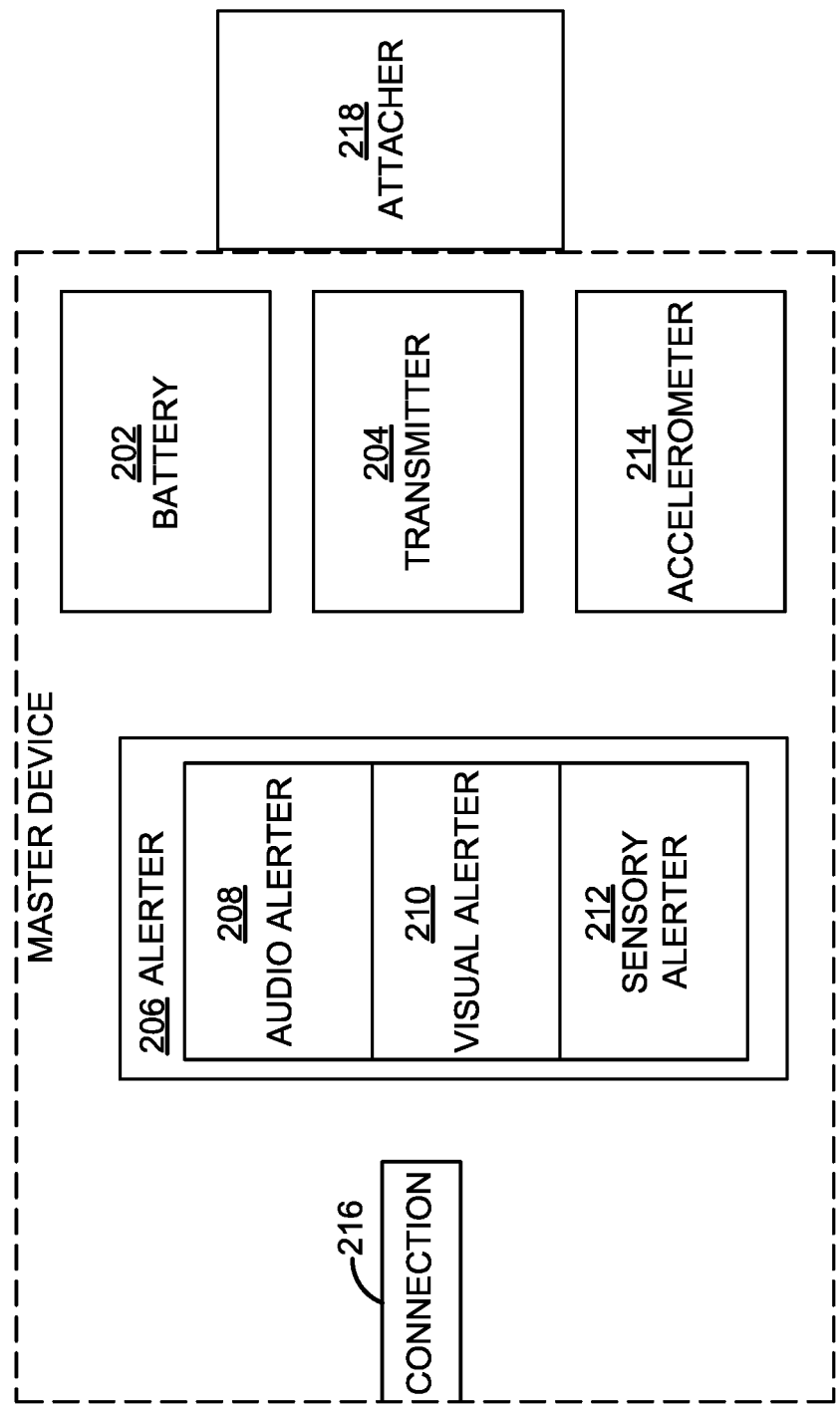
FIGS. 2A and 2B are schematic diagrams illustrating implementations of example components of one or more systems described herein.

With continued reference to FIGS. 1A and 1B, FIGS. 2A and 2B are component diagrams illustrating schematic implementations of example components of one or more systems described herein. As illustrated in FIG. 2A, the master device 102 can comprise a battery 202 that provides electrical power to the master device 102, and one or more of the various components therein. Further, the master device 102 can comprise a wireless transmitter 204 that transmits a wireless alert signal when an alert state is activated in the system. Additionally, the master device 102 can comprise an alerting component 206 that provides an alert to proximate personnel. In one implementation, the alerting component 206 can comprise one or more of: an audio alerter 208, such as an audible speaker (e.g., emitting an alarm sound); a visual alerter 210, such as a set of one or more lights (e.g., flashing strobe, etc.); and a sensory alerter 212, such as a vibrating device that produces a vibration detectable by personnel proximate the master device 102.

In one implementation, the master device 102 can comprise an accelerometer 214 that can detect movement of the master device 102. For example, if the accelerometer 214 detects that the master device 102 has moved past a threshold acceleration (e.g., or tilt), such as when impacted with sufficient force, the alert system can be activated. As an example, the work zone boundary marker 152a (e.g., cone, barrel, etc.) with which the master device 102 is engaged may be struck directly, or at any angle, by a vehicle, and the tripwire 104, described above, may not disconnect from the master device 102. In this example, the accelerometer 214 can detect the sudden acceleration caused by the impact, resulting in activation of the alert system (e.g., alert state). In one implementation, the master device 102 can comprise an attachment component 218 that is used to operably, selectably engage the master device 102 (e.g., the housing of the master device 102) with the work zone boundary marker 152a.

Figure 2B:
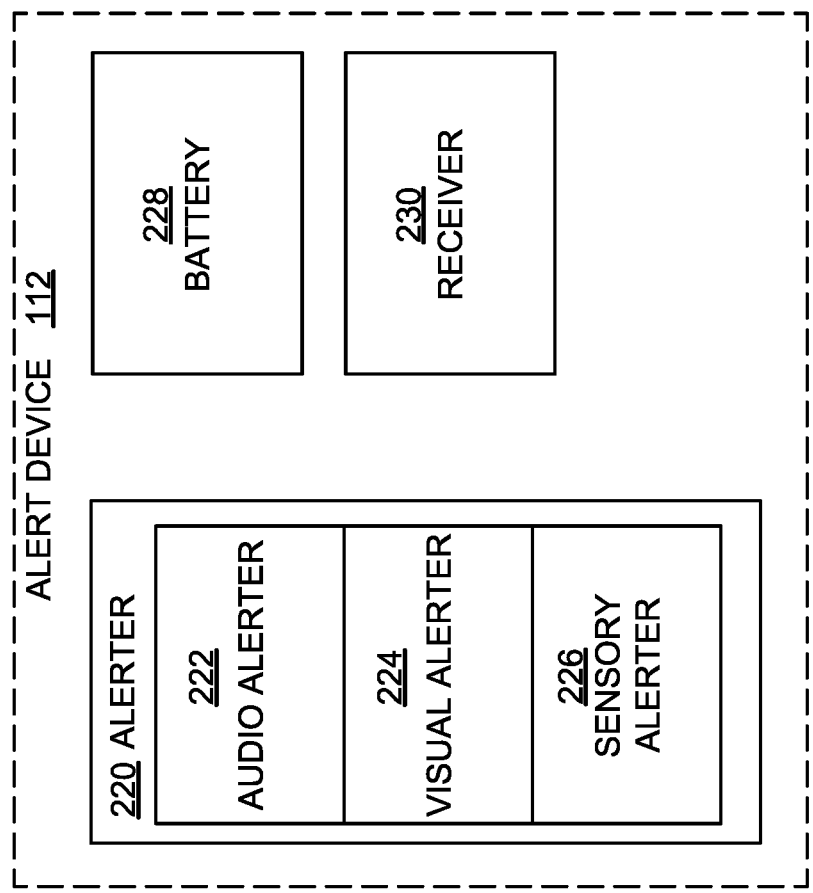

FIG. 2B illustrates one implementation of an example portable alert device 112, which can be worn by personnel and/or placed in or proximate to the work zone within alerting distance from the personnel. In this implementation, the portable alert device 112 can comprise a battery 228 that provides electrical power to the portable alert device 112, and one or more of the various components therein. Further, the portable alert device 112 can comprise a wireless receiver 230 that receives the wireless alert signal transmitted by the master device 102. Additionally, the portable alert device 112 can comprise an alerting component 220 that provides an alert to proximate personnel to the portable alert device 112. In one implementation, the alerting component 220 can comprise one or more of: a portable audio alerter 222, such as an audible speaker (e.g., emitting an alarm sound); a portable visual alerter 224, such as a set of one or more lights (e.g., flashing strobe, etc.); and a portable sensory alerter 226, such as a vibrating device that produces a vibration detectable by personnel proximate the portable alert device 112.

Figure 3A:
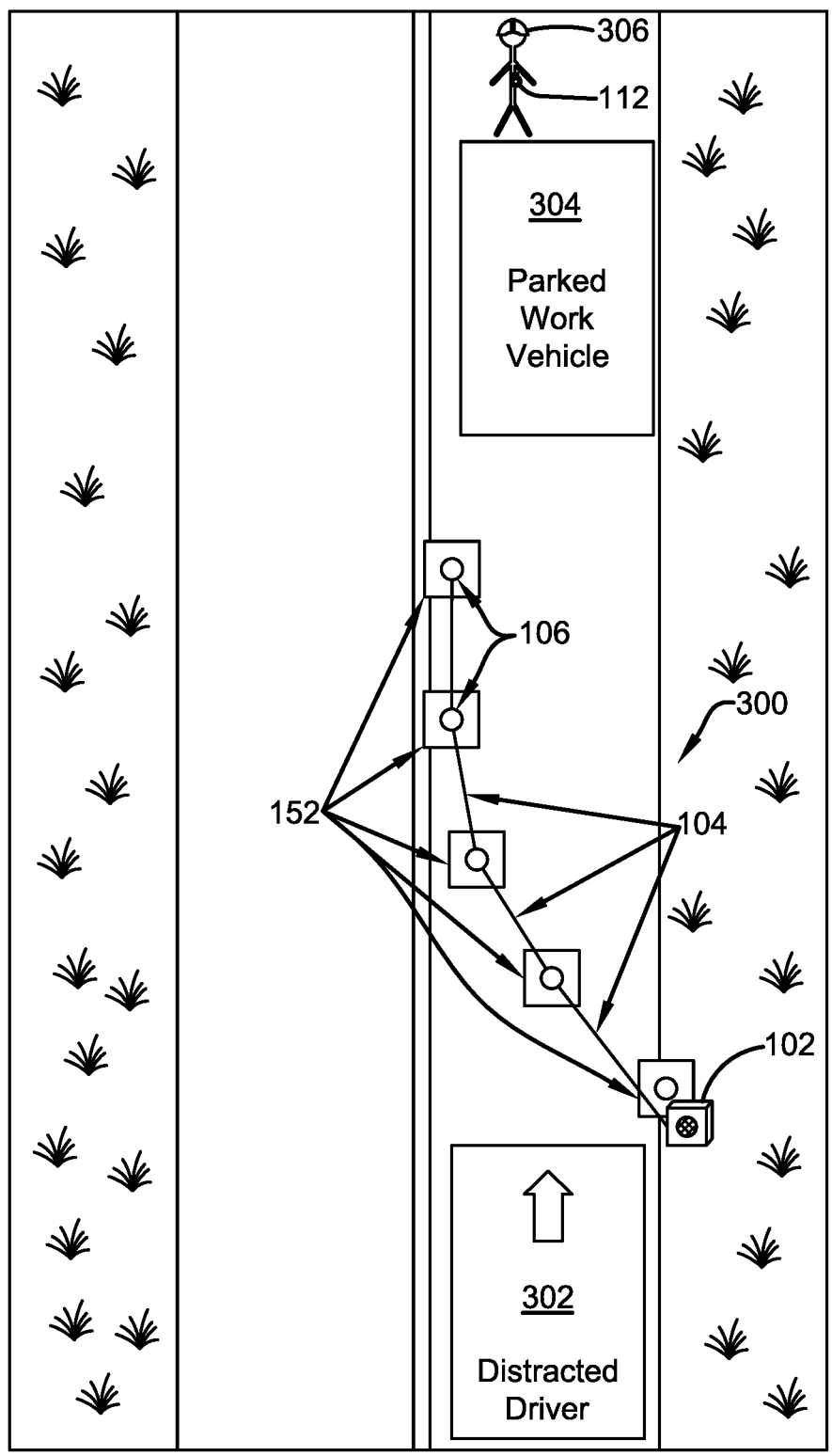
FIGS. 3A, 3B, and 3C illustrate an example implementation of one or more portions of one or more systems described herein.
Figure 3B:
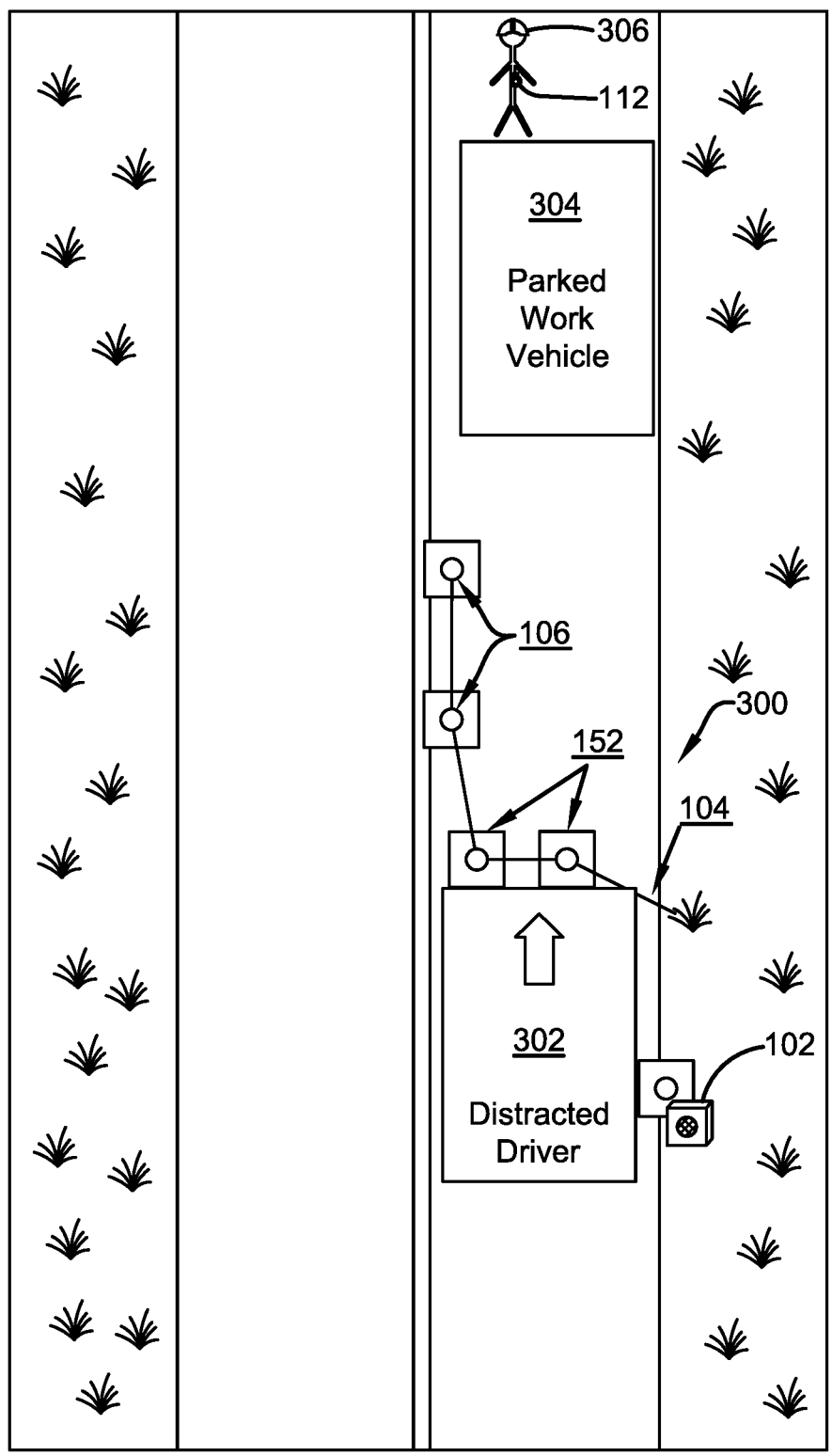
Figure 3C:
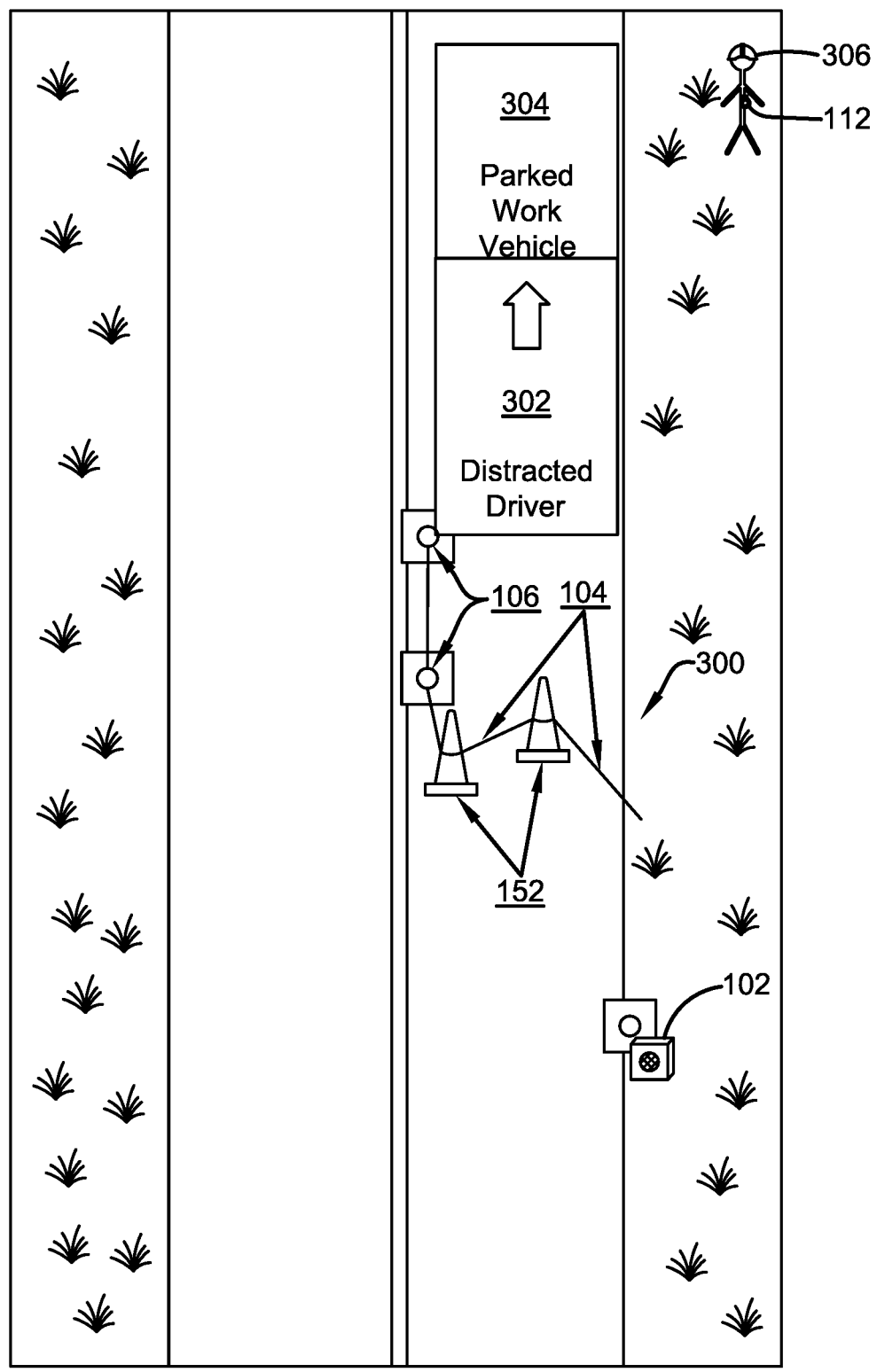

With continued reference to FIGS. 1A, 1B, 2A, and 2B, FIGS. 3A, 3B, and 3C, illustrate an example implementation of one or more portions of one or more systems described herein. As an illustrative example, FIGS. 3A-3C depict a top down view of an example work zone on a single lane road, comprising two sides. Of note, the work zone is not to scale, and a variety of factors, including the speed limit of a road, weather and other factors, can be determinative of the appropriate placement of the work zone boundary markers 152 behind a work vehicle 304. In the illustrative implementation of FIG. 3A, a worker 306, wearing the portable alerter 112, is positioned in front of a parked work vehicle 304, with an example work zone intrusion alarm system 300, as described herein, set up behind the parked work vehicle 304. The example work zone intrusion alarm system 300 comprises the master device 102, operably engaged with the tripwire 104 (using the coupler, not shown). Respective boundary marker engaging components 106 are each selectably engaged with a corresponding work zone boundary marker 152. Further, a distracted driver 302 is approaching the demarcated work zone from the bottom.

In the illustrative implementation of FIG. 3B, the distracted driver 302 has made contact with/impacted the tripwire 104 that is engaged with the work zone boundary markers 152, and held in place by the boundary marker engaging components 106. Further, the tripwire 104 has been disconnected (at the coupler, not shown) from the master device 102, whereupon the master device 102 detects the decoupling of the coupler from the master device 102, and activates an alert state. Activation of the alert state can result in the alerting component (e.g., 206 of FIG. 2A) providing an alert to the worker 306, such as an audible siren (e.g., and/or flashing strobe, etc.). At substantially the same time, the wireless transmitter (e.g., 204 of FIG. 2A) in the master device 102 can transmit the alert signal. Those portable alert devices 112 that are within range of the transmission can receive the alert signal, using the portable alerter's receiver (e.g., 230 of FIG. 2B). Upon receiving the alert signal the portable alerter 112 can activate the portable alerter 220, such as an audible speaker 222 (e.g., or other alert component 224, 226), which can emit an audible alert (e.g. siren) like noise. In this way, for example, when both the master device's 102 alerting component 206 and portable alerter's alerting component 220 produce an alert that is detectable by the worker 306, they may be appropriately alerted that the work zone perimeter has been breached, possibly by a distracted driver 302.

In the illustrative implementation of FIG. 3C, the result of a successful operation of the work zone intrusion alerting system 300 can provide the worker 306 additional time, than without the alert, to move out of a potential oncoming vehicle (e.g., to safety) in response to the alert. As an example, the distracted driver 302 may collide with the back of the parked work vehicle 304. However, in this example, because the worker 306 was alerted prior to the potential collision, they had additional time to move off the road prior to the impact occurring.

Figure 4:
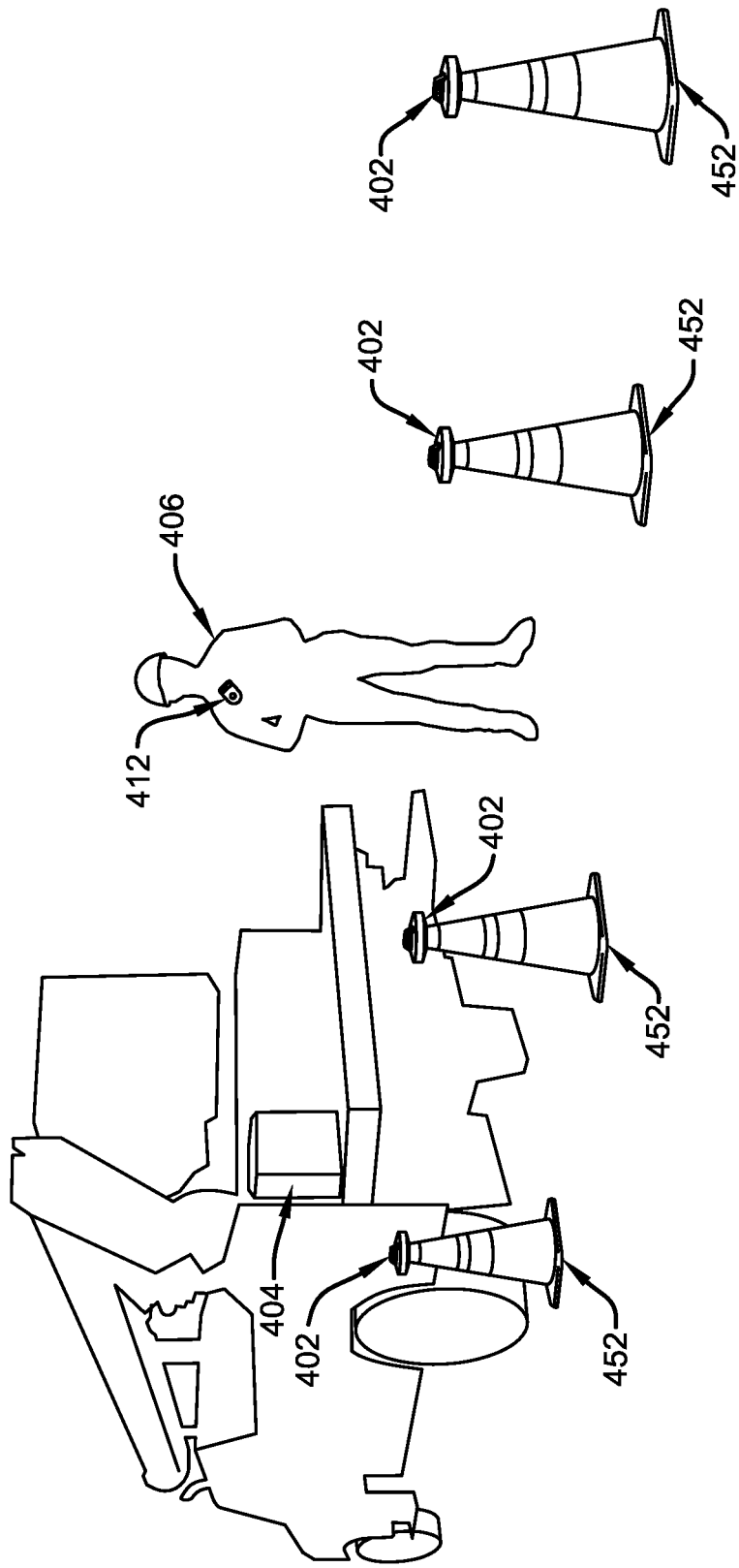
FIG. 4 is a component diagram illustrating another implementation of an exemplary system for providing a work zone instruction alert.

FIG. 4 illustrates one implementation of an exemplary system 400 for providing a work zone intrusion alert. In this implementation, the exemplary system 400 may comprise at least one detection unit 402, a personnel alerter 412, and a base station 404. The detection unit 402 may be configured to be mounted on/to (e.g., attached to) a corresponding work zone boundary marker 452 (e.g., a traffic cone, barrel, gate, or the like). For example, one or more of the detection units 402 can be configured to detect intrusions in a work zone using the Doppler effect and to broadcast an alarm signal upon detection of an intrusion. The personnel alerter 412 may be a wearable device configured to be attached to the worker, such as using the clothing of a worker 406. As an example, the detection units 402 and the personnel alerter 412 can be part of a wireless network that actively communicate wirelessly with various components, for example, and may be arranged in a mesh network.

In some implementations, the base station 404 can be configured to physically store and/or electrically charge the personnel alerters 412 and/or the detection units 402, for example, when they are not deployed. As will be described in more detail below, the detection unit 402, personnel alerter 412, and/or base station 404 can provide an alert (e.g., visual, audio, vibrational, etc.) when a work zone boundary marker 452 is disturbed (e.g., a vehicle hits a traffic cone) and/or when the boundary of the work zone is intruded by a moving object (e.g., a vehicle enters the work zone). As will become apparent below, each component of the system 400 (e.g., the detection units 402, the personnel alerters 412, and the base station 404) may act as a receiver and as a repeater so that intrusion by a moving object anywhere in the system 400 activates an alert by each component throughout the system 400.

Figure 6:
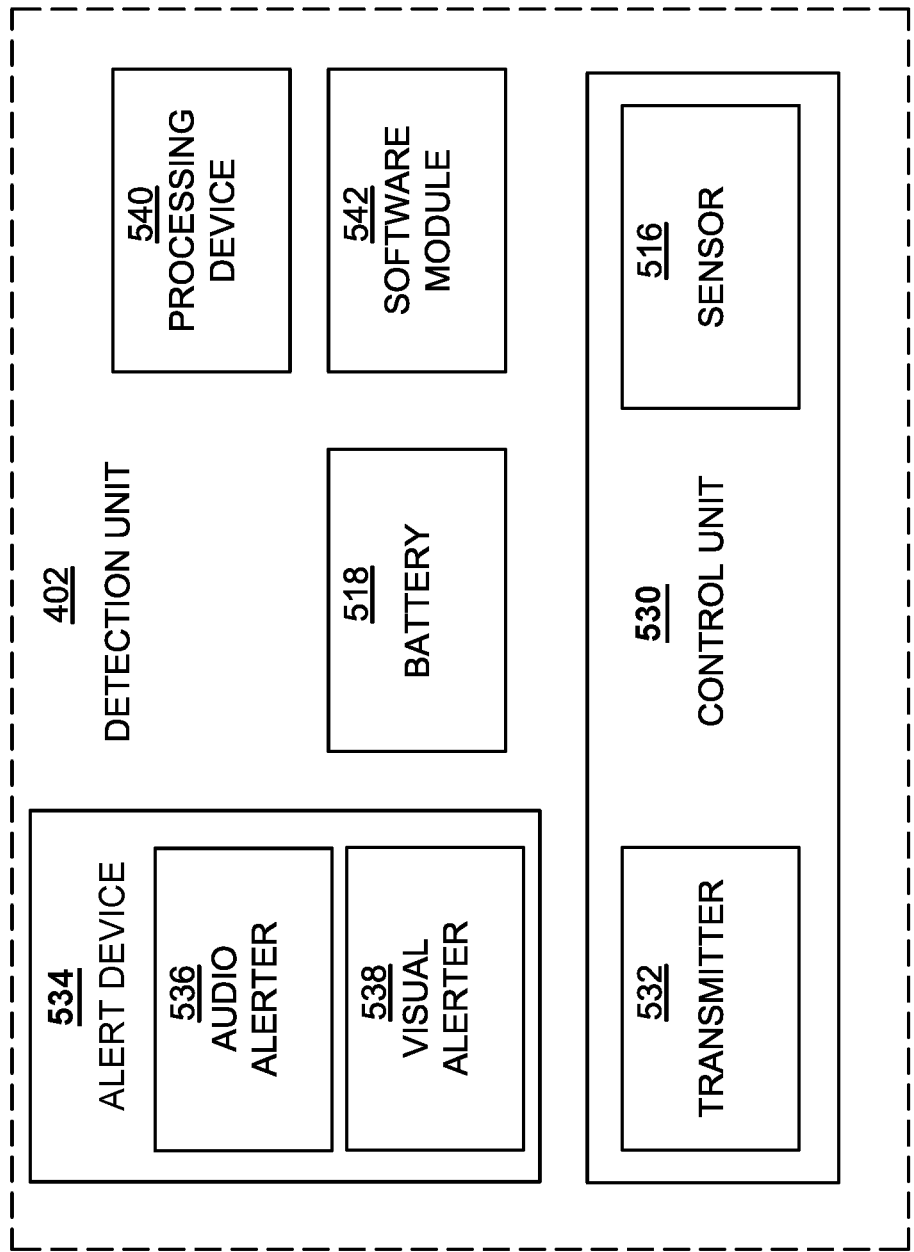
FIG. 6 is a schematic diagram illustrating an implementation of example components of a system described herein.
Figure 7B:
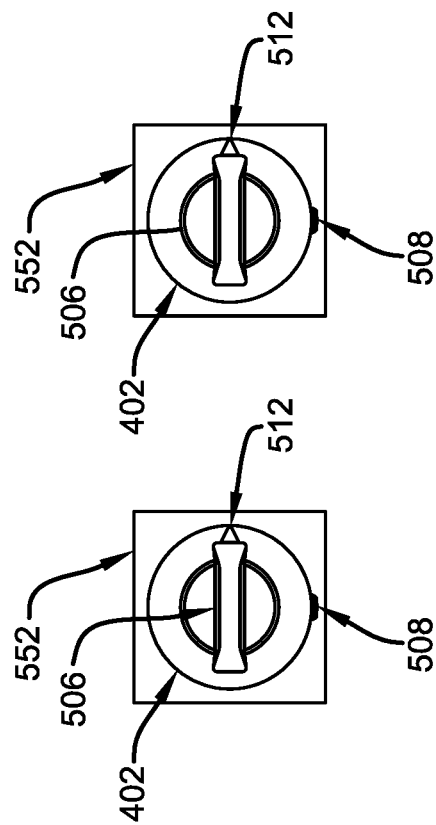
FIGS. 7A and 7B are component diagrams illustrating an example attachment of the detection unit to a traffic boundary marker.
Figure 7A:
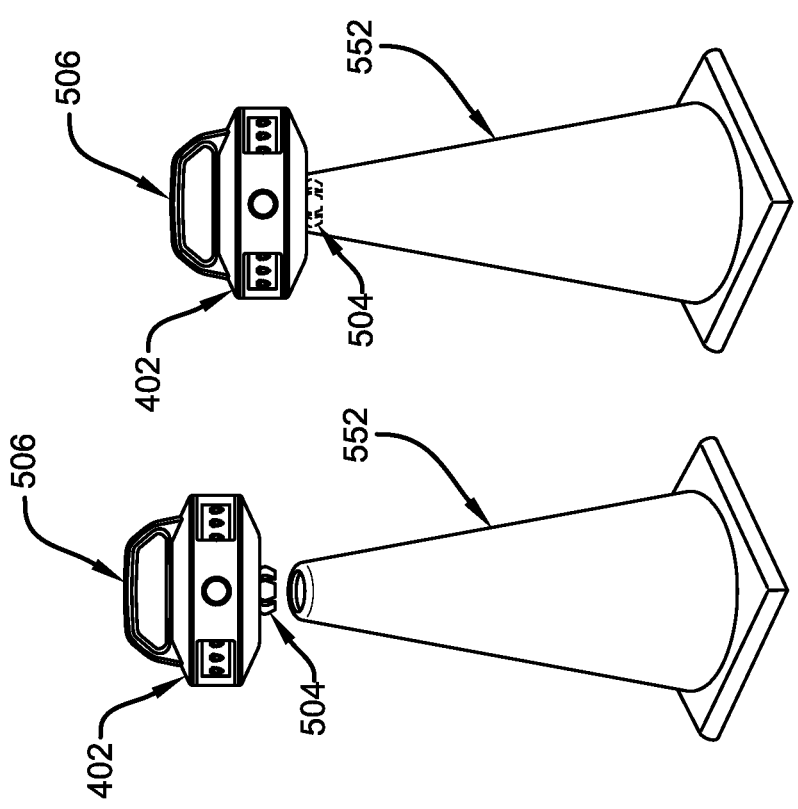
Figure 8C:
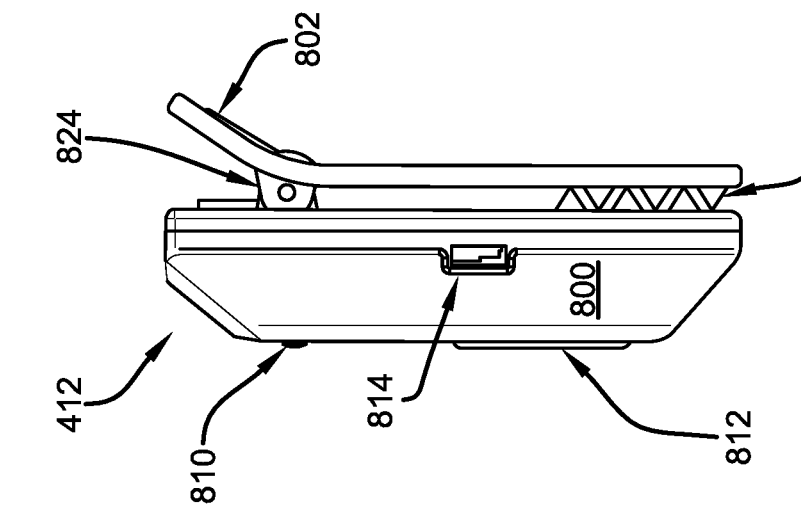
FIGS. 8A through 8H are component diagrams illustrating an example personnel alerter of the exemplary system.
Figure 8B:
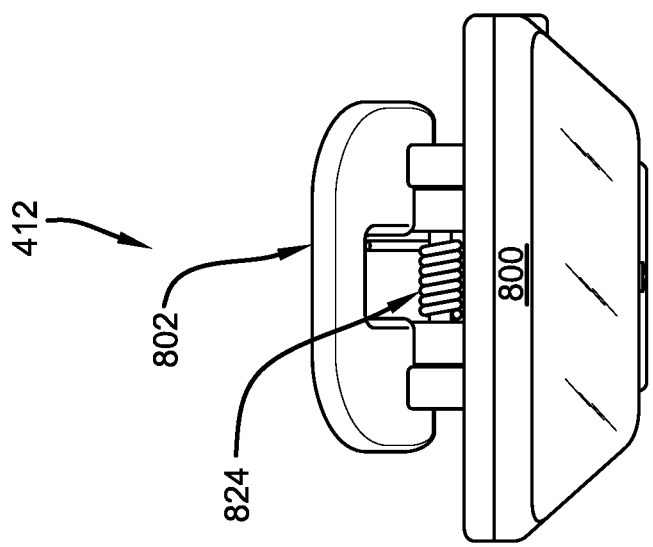
Figure 8A:
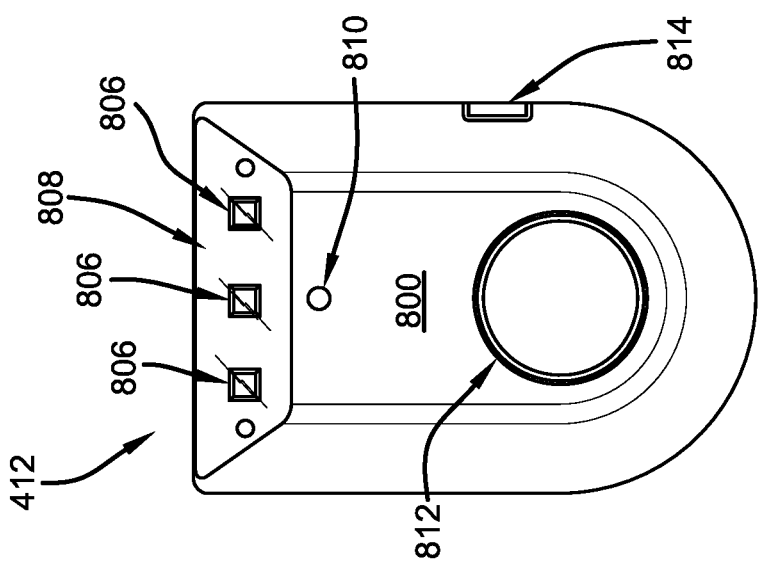
Figure 8E:
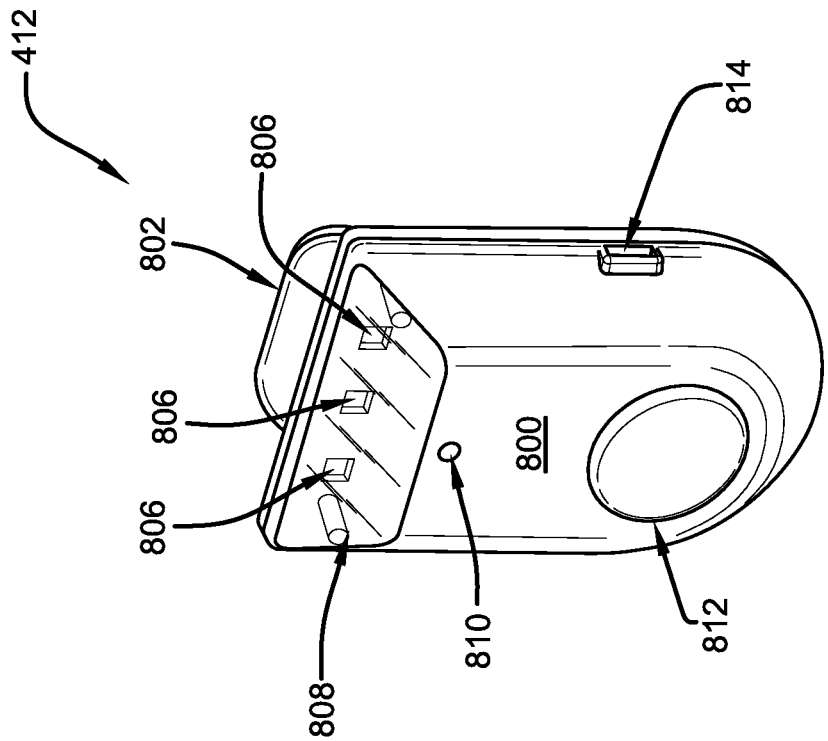
Figure 8D:
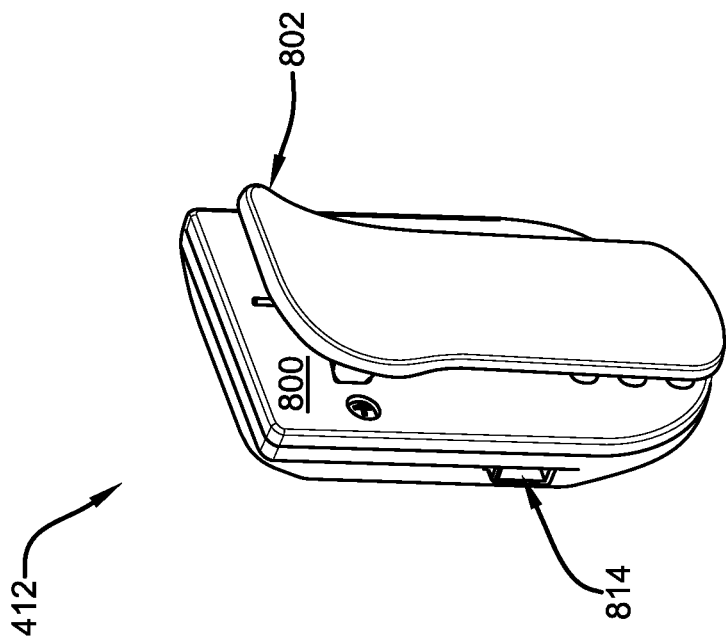
Figure 8F:
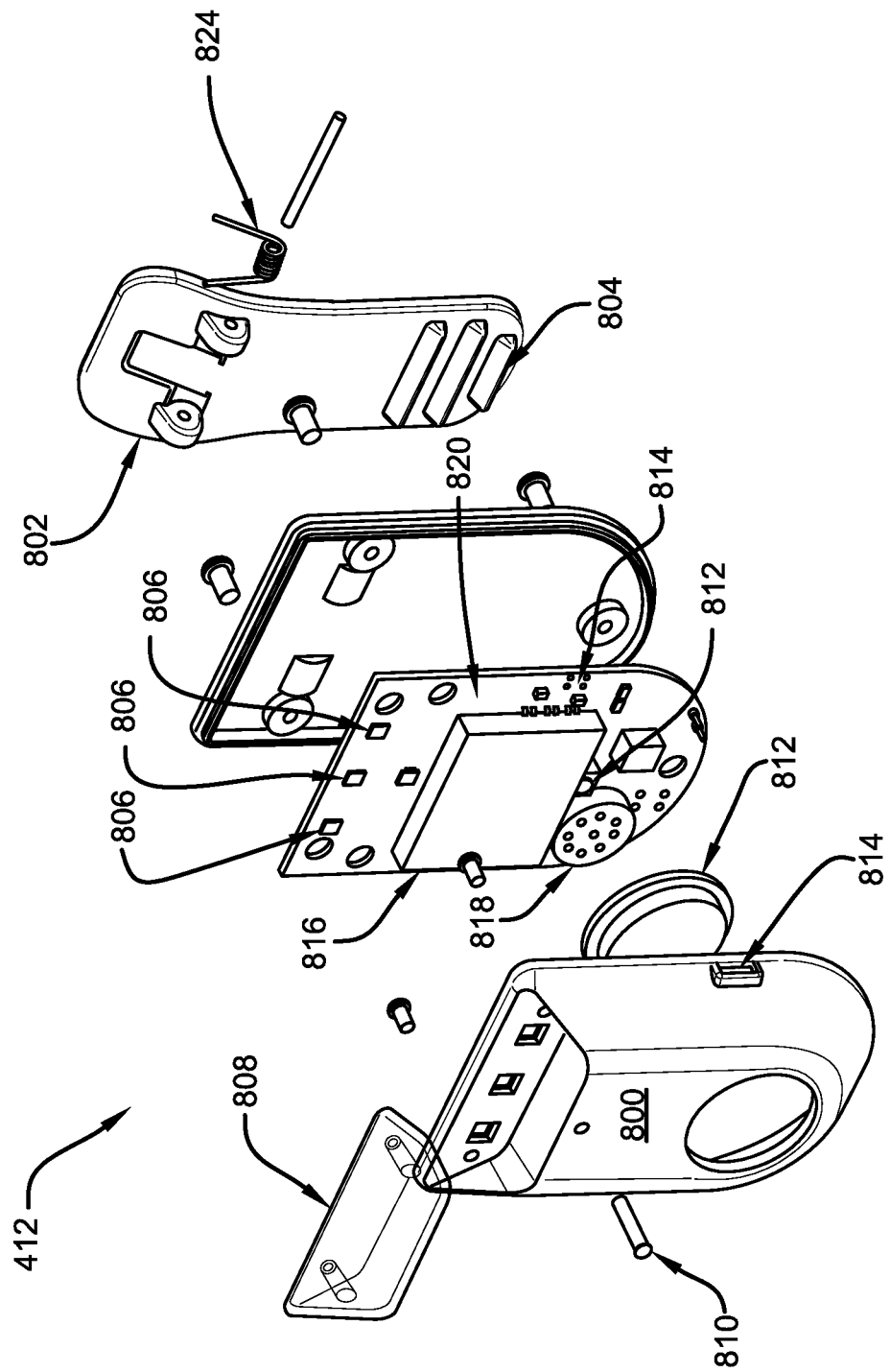
Figure 8G:
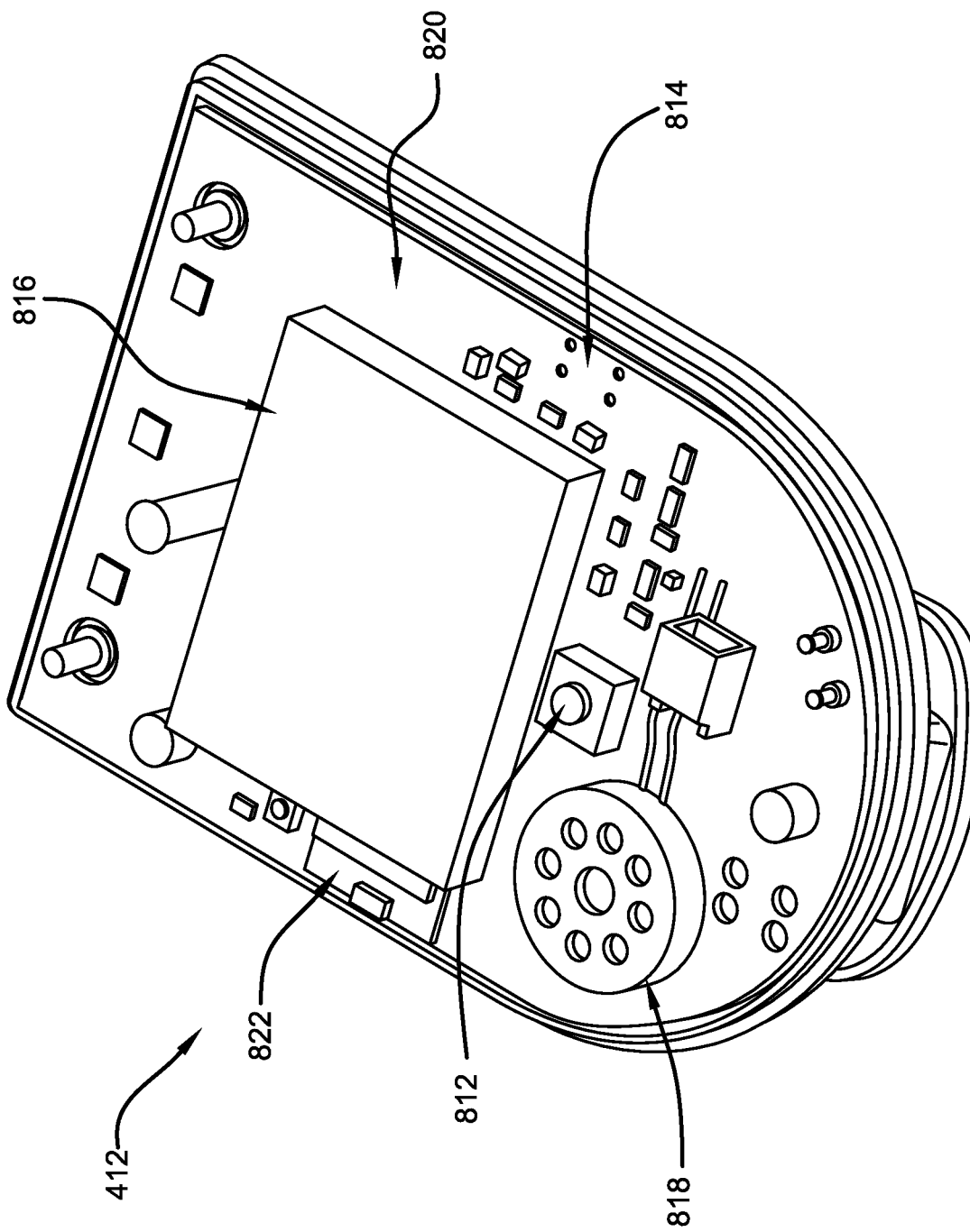
Figure 8H:
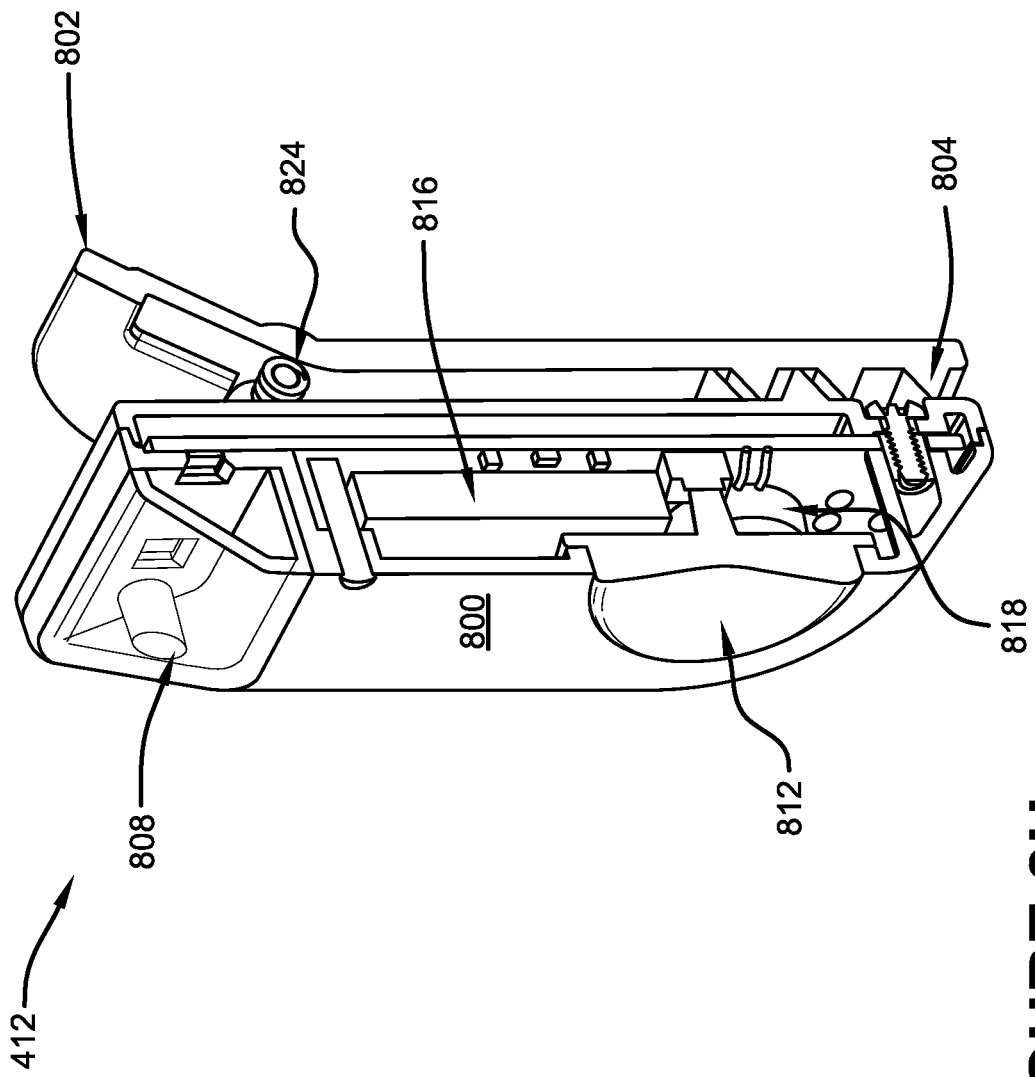

FIGS. 5A-5H is a component diagram illustrating various views of an exemplary embodiment of a detection unit 402 as used in system 400 for providing a work zone intrusion alert. FIG. 6 illustrates a schematic diagram of an exemplary embodiment of the detection unit 402. FIGS. 7A and 7B are component diagrams illustrating one example implementation of one or more detection units 402 deployed. The detection unit 402 has a body which may comprise a housing 502 and, in some embodiments, a handle 506 and/or an engaging member 504. The housing 502 is configured to house components of the detection unit 402, internally (e.g., protection from environment, impact, etc.). The detection unit 402 can be configured to be lightweight and portable for quick and easy assembly of the system 400. To this effect, the detection unit 402 can include a handle 506 extending from a first (e.g., top) side of the detection unit housing 502 and an engaging member 504 extending from a second (e.g., bottom) side of the detection unit housing 502. In the embodiment shown in FIGS. 5A-5G, the handle 506 and the engaging member 504 are located on opposing sides of the detection unit housing 502 with the engaging member 504 configured to engage the work zone boundary marker 452 to secure the detection unit 402 to the work zone boundary marker 452.

The detection unit 402 is configured to be mounted on a work zone boundary marker 452, for example, as shown in FIGS. 4 and 7. Generally, the body is operable to mount to a work zone boundary marker 452. In some embodiments, the engaging member 504 is configured to selectably engage a work zone boundary marker 452 to mount the detection unit 402 onto the work zone boundary marker 452. In some embodiments, selective engagement/coupling can be accomplished by inserting the engaging member 504 of the detection unit 402 into an opening at the top of the work zone boundary marker 452, as will be described in more detail below.

Figure 5E:
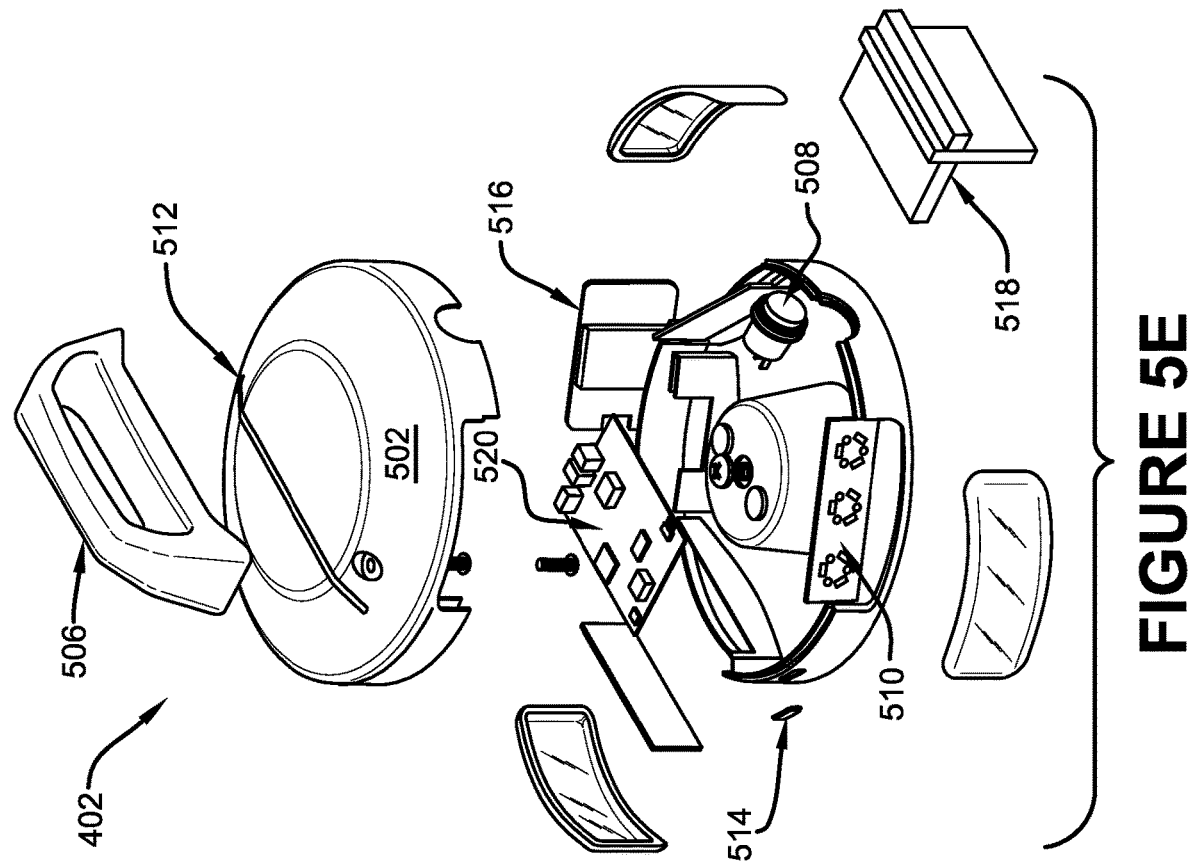
Figure 5D:
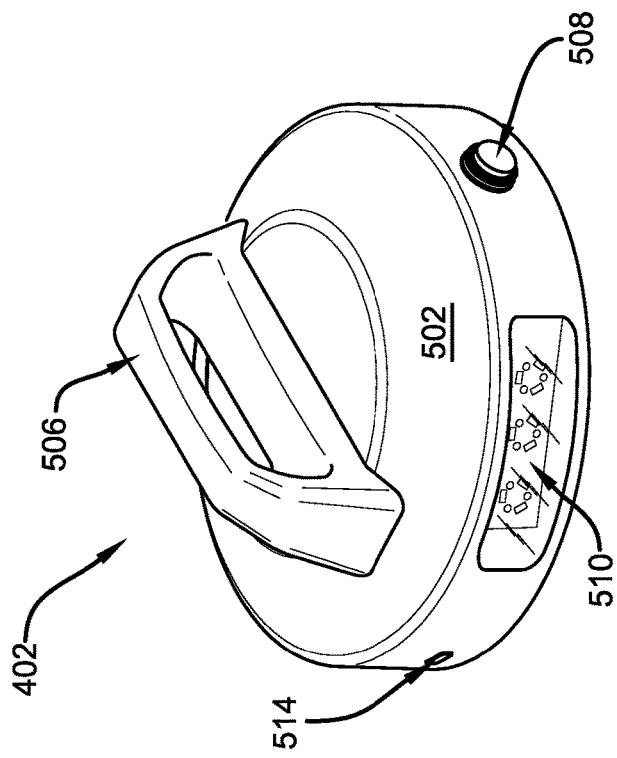
Figure 5F:
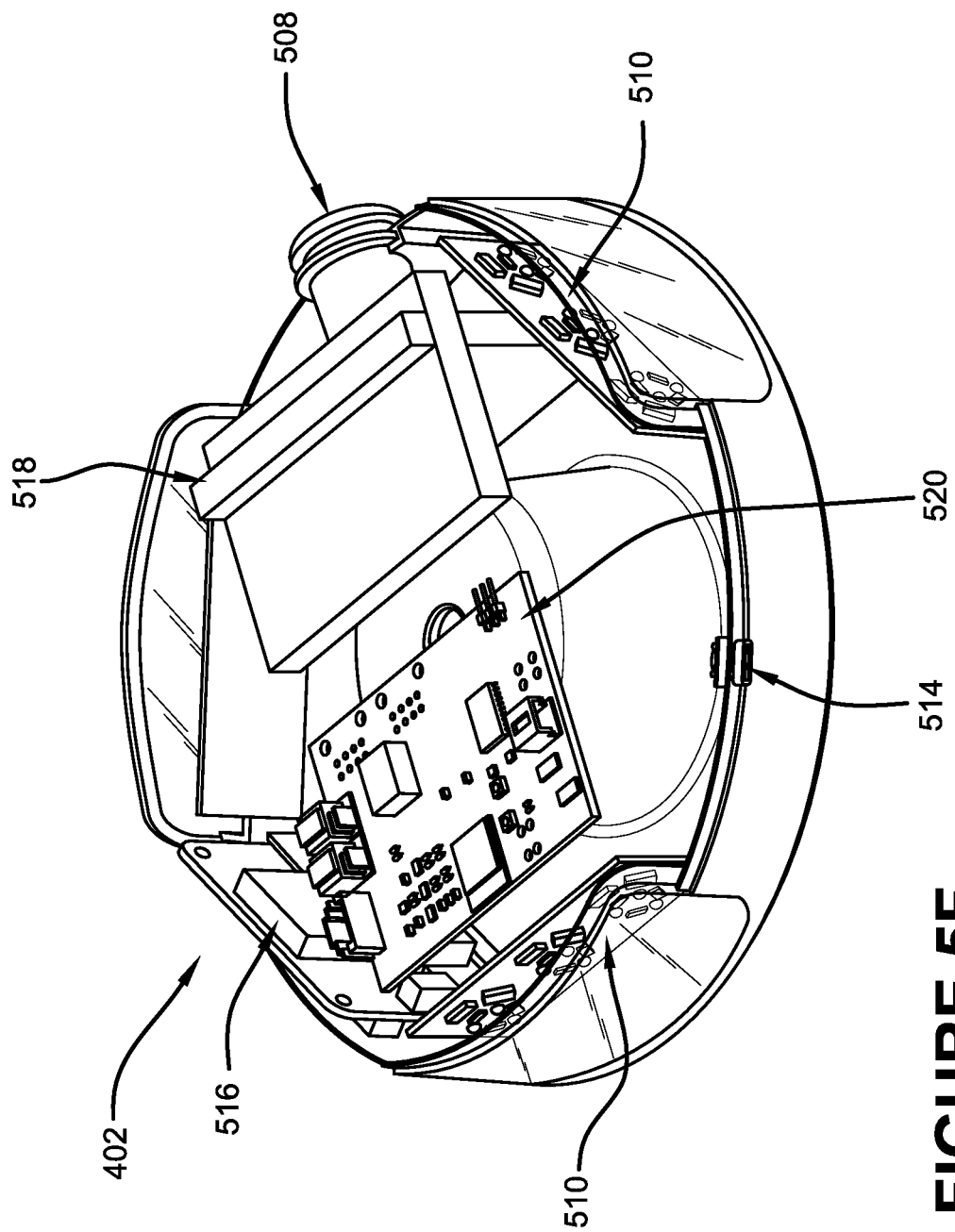
Figure 5G:
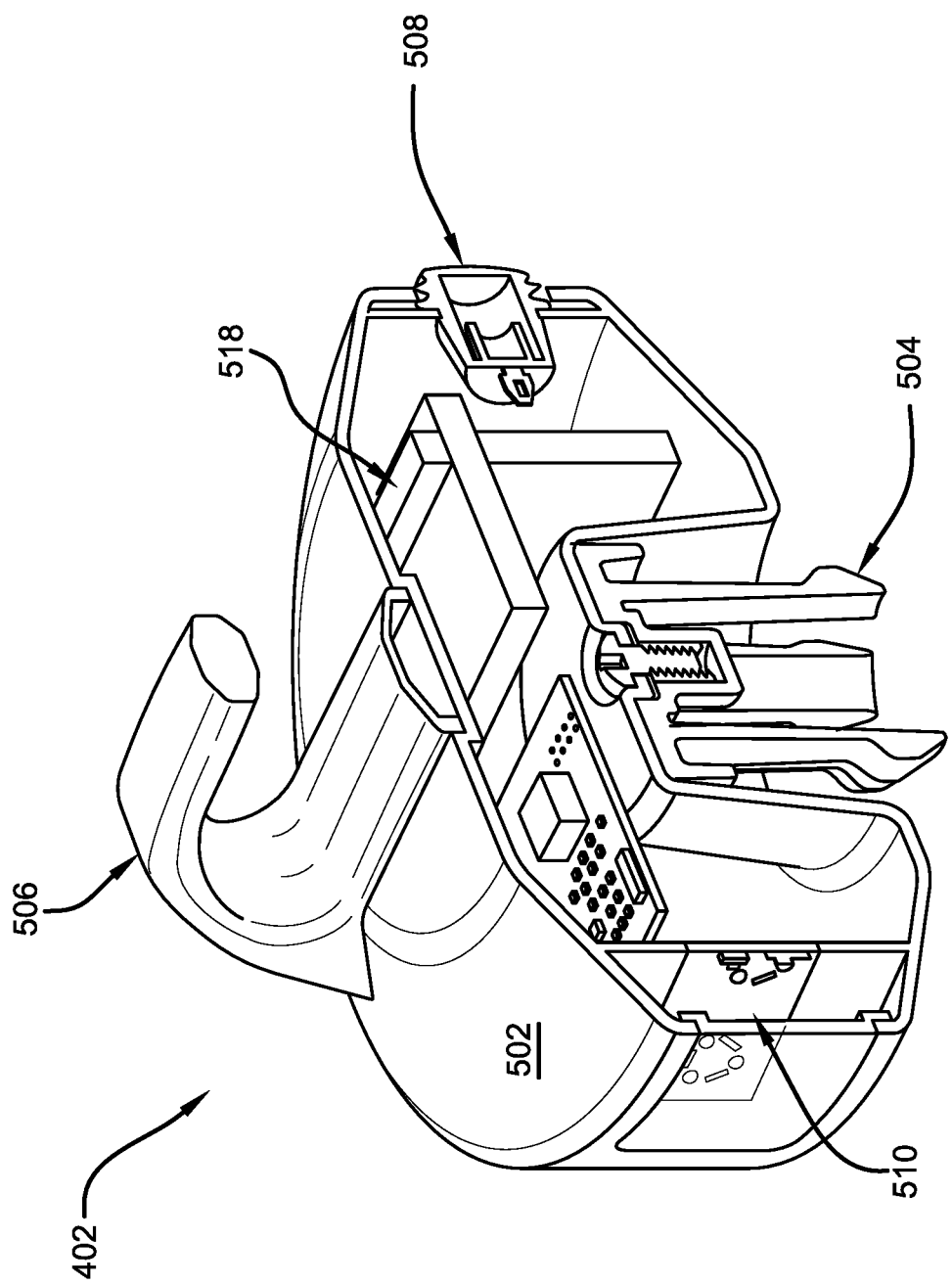
Figure 5H:
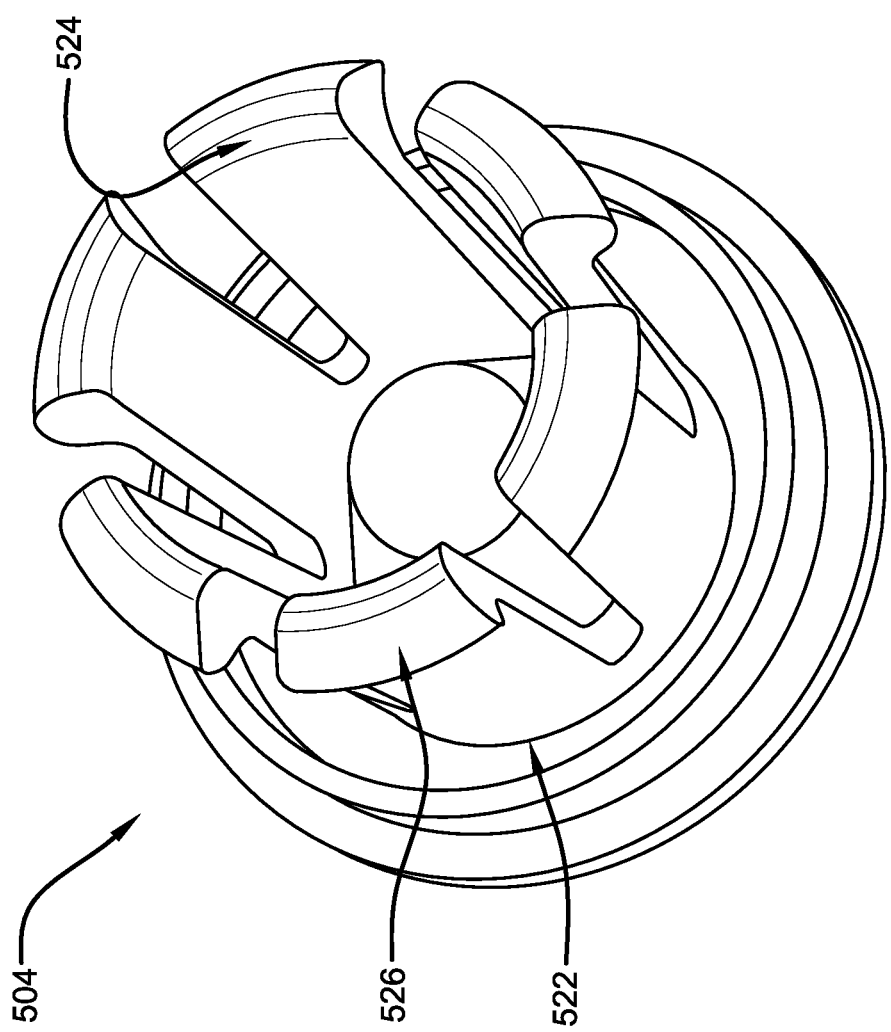

Although the engaging member 504 is not limited to any particular shape or size, the engaging member 504 shown in FIG. 5H has a base 522 that includes fingers 524 extending outward (e.g., downward, vertically—depending on operable orientation) from the base 522 with the fingers 524 being circumferentially spaced around a center portion of the base 522. In this example, the respective ends of the fingers 524 can comprise a lip 526 that extends radially outward from the center portion of the base 522. As an example, to mate the engaging member 504 with the work zone boundary marker 452, the fingers 524 can be deflected radially inward to insert the fingers 524 of the engaging member 504 into an opening in the work zone boundary marker 452. Upon insertion, the fingers 524 can rebound, moving radially outward until the fingers 524 engage the inner wall of the work zone boundary marker 452. Additionally, the lip 526 on respective fingers 524 can engage a rim defining the opening in the top of the work zone boundary marker 452, which can help secure the detection unit 402 to the work zone boundary marker 452. In this manner, for example, a worker 406 may securely mount the detection unit 402 onto any suitable work zone boundary marker 452.

In some implementations, the detection unit housing 502 can comprise a variety of components, with some components disposed externally for interaction with a user, and other components disposed internally in the housing 502, for example, for protection from exposure and/or damage. The detection unit 402 can comprise a power button 508 (e.g., or power switch) to initiate activation of the detection unit 402. The detection unit 402 may also comprise at least one set of lights 510, for example light emitting diodes (LEDs) or strobe lights. As an example, the lights 510 may be activated when the unit is powered, can be activated at night, through user action, and/or activated automatically (e.g., in the presence of low light, to signal the location of the detection unit 402, and/or to serve as a visual alert when an object is detected in the vicinity of the work zone boundary), as will be described in more detail below. In some implementations, the detection unit 402 may comprise a USB port 514 (e.g., or other appropriate communication/power system, such as pci express, InterChip USB, FireWire, Ethernet, MIDI, eSATA, Thunderbolt, etc.), for example, which may be used to charge the battery 518 of the detection unit 402. In some implementations, the USB port 514 may permit a user to communicate with the detection unit 402, such as to retrieve or upload data from/to the detection unit 402, as an example, by transferring the data to/from a computing device, and/or portable storage device.

In some implementations, the detection unit 402 can comprise a printed circuit board (PCB) 520. The PCB 520 can comprise circuits and other elements to connect and control the various components and systems of the detection unit 402, including but not limited to a processor or processing device 540. In some implementations, the detection unit 402 can comprise an alignment mechanism 512, for example an arrow icon, for reasons that will explained below.

As an example, the detection unit 402 can be used to monitor a boundary of a work zone, or otherwise desired exclusion zone, for potential intrusion of the work zone by a moving object. For example, a detection unit 402 may monitor oncoming traffic in the vicinity of a construction zone. In some embodiments, a personnel alerter 412 can be worn or carried by workers 406 located within the work zone. The personnel alerter 412 may be in communication with the detection units 402 to notify workers 406 of created potential work zone intrusion, for example, by a quickly approaching vehicle, so that the worker 406 can take evasive action and to avoid contact with the vehicle.

In some implementations, the detection unit 402 comprises at least one sensor 516. For example, the sensor 516 may be disposed in, or in communication with, a control unit 530. Data from the sensor 516 may be received by another control unit 530 component, such as a transceiver, located in the detection unit 402. In some implementations, the sensor 516 may be a Doppler sensor which is configured to detect an object, by the presence or motion of the object. For example, the detected presence or motion may be determined by an indication of compressed radar waves or expanded radar waves to identify whether an object is approaching or moving away. Further, in some implementations, the indication of the state of the radar wave may be used to detect the velocity (e.g., speed and direction) of a moving object, the distance to a moving object, and/or the presence of an intruding object, using the Doppler effect. For example, a Doppler sensor uses the phase difference between a transmitted signal and a reflected signal (e.g., the Doppler return signal)—where the reflected signal may be reflected from a reflective object in the path of the emitted signal—to detect objects, such as vehicles, present in the vicinity of the work zone. The transmitted signal and reflected signal may be a radar signal.

In some embodiments, the detection unit 402 may comprise at least one transmitting antenna and at least one receiving antenna coupled with the sensor 516. As an example, an antenna may provide a more accurate determination of the position of an object obtained from the different transit times of a signal, such as transmitted from a transmitting antenna, reflected and returned to different receiving antenna. In this example, the distance of the object from the work zone can be determined, and a trajectory (e.g., direction of travel) of the object, and, in some cases the velocity of the moving object, may be determined.

The detection unit 402 may comprise an alignment mechanism 512, such as directional arrows. In some implementations, the directional arrows can operably point in the direction of the coverage (e.g., beam) of a Doppler sensor 516 monitor (e.g., detects reflected signals that were emitted from the detection unit 402), establishing the range of coverage by the detection unit 402. In some implementations of the system 400, the alignment mechanism 512 of one detection unit 402 can operably be directed to point in the direction of another detection unit 402. In this implementation, the arrow can help align the detection units 402 collectively to cover the desired boundary of the work zone, by aligning the transmission of signals from one detection unit 402 to another detection unit 402. Thus, the alignment mechanism 512 can advantageously assist personnel in arranging the detection units 402 such that the corresponding Doppler sensor 516 can be used to monitor oncoming traffic along the work zone boundary. As an example, the number of detection units 402 included in a system 400 can depend on the size and shape of the work zone boundary desired to be monitored. For example, a detection unit 402 can be mounted on respective work zone boundary markers 452, alternating boundary markers 452, or any desired combination that provides appropriate coverage.

In some implementations, the detection units 402 can be wirelessly, communicatively coupled with each other (e.g., or a desired set of units, and/or in communication with the base station 404) to create a mesh network. As an example, communicatively coupled detection units 402 can act as a receiver and repeater so that an alarm signal indicated at one detection unit 402 may be broadcast to other units in the mesh network. In this example, other detection units 402 (e.g., or the base station) of the system 400 may receive the broadcast signal and activate their alarms and/or, use their transmitter 532, and transmit an alarm signal to a personnel alerter 412 and/or base station 404.

In some embodiments, the detection unit 402 may comprise a control unit 530 for interfacing with the Doppler sensor 516 and the transmitter 532 to control the transmission of the alarm signal to other detection units 402 and personnel alerters 412. The detection unit 402 may comprise at least one processing device 540 configured to evaluate data, for example to compare with predetermined threshold data, to determine whether an object is detected (e.g., moving) in the vicinity of the work zone boundary being monitored. In various embodiments, the detection unit 402 may comprise one or more software modules 542 comprising code configured to provide for evaluation of a signal indicative of a detected object, for example, to identify a potential work zone intrusion based on the proximity of the moving object to the work zone, direction of travel of the moving object, and/or speed of the moving object.

Moreover, in some embodiments, the detection unit 402 (e.g., the base unit, and/or the personal alerter 412) can activate an audible, visual, and/or vibrational alert, such as an alarm, when the detected object (e.g., vehicle) crosses a predetermined distance, trajectory, and/or velocity threshold. For example, setting a detection threshold at a higher value (e.g., an object size, direction, and/or speed) may mitigate activation of a false alarm, such as by a pedestrian or animal. Moreover, for example, the detection unit 402 may include a time duration threshold to determine whether a moving object has maintained a location, and/or direction of travel, for a desired time interval (e.g., long enough to indicate a probable intrusion of the work zone). The detection of the time interval for the detected object may help mitigate the activation of false alarms.

In some implementations, the detection unit 402 may comprise other types of sensors. In some embodiments, the detection unit 402 can comprise a magnetic sensor to detect the presence of metal objects in order to differentiate from non-metallic objects (e.g., people, animals). In some embodiments, the detection unit 402 can comprise one or more optical sensors (e.g., infrared (IR) light or lasers) to detect objects moving between work zone boundary markers 452. In some embodiments, the detection unit 402 may further comprise a motion sensor to detect traffic cone tilt, vibration, shock, or fall. The user (e.g., service provider or manufacturer) may adjust the sensitivity of the sensors to reduce false alarms by tuning or disabling the motion sensor motion sensitivity, the Doppler sensor range, the object detection trigger threshold, the time duration of sensed object's trigger threshold, a gravity threshold of nearby ferromagnetic objects. In some embodiments, more than one type of sensor may be active at the same time, and the processor/software modules can use the results of respective sensors to provide more accurate information leading to improved reliability of the system 400 and fewer false alarms.

In some implementations, the system 400 may comprise a mechanism for continuous improvement of system performance. For example, the system 400 may be configured to undertake real time learning, for example, by capturing data associated with events, storing the data linked to the events in a database, and adjusting a detection algorithm based at least on the updated data. For example, event data may be stored in some form of memory for diagnostic purposes. As an example, by recording and processing data associated with the effectiveness of detection over time, the algorithm learning process may improve accuracy of its results over time, thereby providing for continuous improvement of the selective intrusion detection system 400. In some embodiments, software modules 542 comprise code that operates to examine data associated with a detected object (e.g., direction of a moving object) detected by the Doppler sensor 516 and estimate a work zone intrusion probability based at least on actual versus ideal object detection. An alert device 534, such as an alarm emitted from an audio alerter 536 and/or a visual alerter 538, may be operatively connected to the processing device 540, wherein the processing device 540 and alert device 534 are configured to activate an alert in the event the processing device 540 and/or software module 542 determines an improved detection of an impending work zone intrusion.

The system 400 disclosed herein can comprise a Doppler sensor 516 that can be used to detect an object (e.g., oncoming vehicle) at or prior to the vehicle entering the work zone, and/or impacting a work zone boundary marker 452 using the Doppler effect. The detection unit 402 broadcasts (e.g., transmits using the transmitter 532) an alarm signal upon detection of an object (e.g., moving) in the work zone. As an illustrative example, in the event an oncoming vehicle collides with the work zone boundary marker 452, the detection unit 402 may have one or more sensors (e.g., circuitry, such as disposed on the PCB) configured to detect when a detection unit 402 is moved (e.g., knocked over), and in response, produce a signal (e.g., wirelessly) resulting in activation of an alert. In some implementations, the detection unit 402 may be configured to monitor its own internal health, along with associated components such as, for example, battery life.

In some implementations of the system 400, the detection unit 402 can be in wireless communication with one or more personnel alerters 412 as well as a base station 404. The base station 404 may be communicatively coupled with the detection unit 402, and can be configured to operably electrically charge the detection unit 402, such as when the detection unit 402 is stowed in the base station 404. The base station 404 may be configured to receive and store information from one or more detection units 402. In some implementations, the base station 404 may serve as a charging station to charge the detection units 402 and/or personnel alerters 412. In some embodiments, the base station 404 contains an alarm (e.g., siren, light signal) and can act as a repeater by broadcasting an alarm signal to the one or more personnel alerters 412. For example, the base station 404 may act as a repeater by receiving a signal, such as an alarm signal from the detection unit 402 and/or the personnel alerter 412, and can rebroadcast the signal to the detection unit 402 and/or the personnel alerter 412, for example, so that the signal can cover a distance that may be outside of the range of an individual unit, and/or may be received by a unit otherwise blocked by an obstruction (e.g., a vehicle or other construction equipment).

As illustrated in FIGS. 4 and 8A-8H, the exemplary system 400 can comprise one or more personnel alerters 412 (e.g., portable communicator and/or alarm). In one implementation, the personnel alerter 412 may be sized to be effectively worn on (e.g., a wearable device), and/or used by, workers 406 inside the work zone, such as on a belt or clothing of the worker 406. In one implementation, the personnel alerter 412 can comprise an engagement component 802, such as a clip or other selectable engaging component, or the personnel alerter 412 can be placed in a convenient location in the work zone. In some embodiments, the engagement component 802 can comprise a clip that is spring loaded 824 to apply localized tension to the personnel alerter 412 at a retaining element 804, for example, a set of interlocking teeth. As an example, the interlocking teeth 804 are configured to selectably secure an article of clothing between the interlocking teeth 804 of the clip 802 to provide for the personnel alerter 412 to be operably attached to a worker 406.

In various embodiments, the personnel alerter 412 may comprise, for example, a vibration module (e.g., motor) to provide perceived vibration, a sound module (e.g., speaker) to provide audible indicators, and/or a visual module (e.g., light(s)) to provide visual indicators, which can be configurable to alert a worker 406 of a potential work zone intrusion. In use, as one example, the personnel alerter 412 receives a wireless alarm signal from one or more detection units 402 (e.g., and/or base unit 404) and, in response, the personnel alerter 412 activates an alert (e.g., audible alert, visual alert, and/or sensory alert). As an example, the personnel alerter 412 may initiate an audible alert using a speaker 818 to alert workers 406 of a work zone intrusion.

In some implementations, the personnel alerter 412, if in the form of a wearable device, may be programmed to vibrate at varying levels of vibration magnitude. For example, increased intensity (e.g., magnitude) of vibrations may be used to help a worker 406 sense the alert because, in some instances (e.g., noisy environment), an audible alert alone may not be noticed by a worker 406. Examples where intense vibrations may be a method of notifying a worker 406 of a work zone intrusion (e.g., an oncoming vehicle) include situations involving the presence of significant environmental noise or, in the event a worker 406 is hard of hearing.

FIGS. 8A-8H show various views of an exemplary embodiment of a personnel alerter 412, as can be used in system 400, for providing a work zone intrusion alert. In some implementations, the personnel alerter 412 may have a portable body comprising a housing 800 configured to house components of the personnel alerter 412 internally (e.g., protection from environment, impact, etc.), and configured to be portable, such as carried or worn by a user. In some implementations, the personnel alerter housing 800 can comprise various components, with some components disposed externally for interaction with a user, and other components disposed internally in the housing 800, for example, for protection from exposure and/or damage. In some implementations, the personnel alerter 412 can comprise a power button 812 (e.g., or switch) which activates/deactivates power (e.g., turns on/off) the personnel alerter 412. As an example, the power button 812 can activate components within the personnel alerter 412 resulting in the establishment of a wireless connection between the personnel alerter 412 and the detection units 402 and base station 404. The personnel alerter 412 may comprise a battery power indicator 810, such as a light, to indicate the battery life of the personnel alerter 412. For example, the light of the battery power indicator 810 may change color (e.g., red, yellow, green, or some other colors) as the battery's power reduces. The personnel alerter 412 may also comprise at least one set of lights 806, for example LED lights protected by a clear lens 808. As an example, the lights 806 may be activated at night to provide a visual alert when an object is detected within the vicinity of the work zone boundary, as will be further described below.

The personnel alerter 412 may comprise a speaker 818 to provide an audible alert to the worker 406 when an alert signal is activated, such as when a moving object is detected within the vicinity of the work zone boundary. The personnel alerter 412 may also comprise a USB port 814 (e.g., or other appropriate communication/power system, such as pci express, InterChip USB, FireWire, Ethernet, MIDI, eSATA, Thunderbolt, etc.), for example, which may be used, in combination with a charging coupler, to charge the battery 816 of the personnel alerter 412. In some implementations, the USB port 814, in combination with a communication coupler, may permit a user to retrieve data from the personnel alerter 412 by transferring the data to a portable storage device. The personnel alerter 412 may have a Bluetooth low energy (BLE) operational unit 822 designed for low power consumption by the system 400. For example, the BLE unit 822 can comprise a communication module that is used to set up and use a local or personal area network with proximate devices, such as the base unit 404 and/or one or more of the detection units 402. The BLE operational unit 822 may communicate with other BLE operational units 822 included in other personnel alerters 412 of the system 400 to activate the alerts on some or all of the personnel alerters 412, for example, when a vehicle intrusion is detected. The personnel alerter 412 can comprise a printed circuit board (PCB) 820. The PCB 820 can comprise circuits and other elements to connect and control the various elements of the personnel alerter 412.

FIG. 9 illustrates a schematic diagram of another implementation of an example personnel alerter 912 for example, which can be worn by a worker 406 and/or placed in or proximate to the work zone within alerting distance from the worker 406. In this implementation, the personnel alerter 912 can comprise a battery 928 that provides electrical power to the personnel alerter 912, and one or more of the various components therein. Further, the personnel alerter 912 can comprise a wireless receiver 930 that receives the wireless alarm signal transmitted by one or more of the detection unit(s) 402 and the base station 404. Additionally, the personnel alerter 912 can comprise an alerting component 920 that provides an alert to personnel proximate to the personnel alerter 912. In one implementation, the alerting component 920 can comprise one or more of: an audio alerter 922, such as an audible speaker (e.g., emitting an alarm sound); a visual alerter 924, such as a set of one or more lights (e.g., flashing strobe, etc.); and a sensory alerter 926, such as a vibrating device that produces a vibration detectable by personnel proximate the personnel alerter 912. In one implementation, the system 400 provides notifications that are assigned based on the condition. The notifications reflect a condition by adjusting lights, altering the sound patterns of alerts based on traffic and/or worker conditions (reading slow vehicle or worker/person walking into zone). Any type of lighting pattern may be used in the system 400 such as, for example, variable/random lighting patterns based on types of alerts. In some embodiments, the user and/or manufacturer may have ability to enable/disable the flashing lights on the personnel alerter 912.

As an example, the work zone intrusion alarm system 400 can be used to alert a zone worker 406 when an object has been detected in the work zone, such as a moving object, for example, by providing an alert or alarm that signals the worker 406 to move to safety. In one implementation, detecting an intrusion of the work zone by a moving object can be performed using a Doppler sensor 516. The detection unit 402 and personnel alerter 412, 912 can emit both light and sound, for example, alerting the worker 406 to move to safety. The base station 404 may provide an audible alert, and can be used to charge and/or store the personnel alerter 412, 912 and the detection units 402 when they are not in use.

It should be noted that the system 400 can be configured to be capable of modification, depending on the intended use of the system 400 by the user. For example, the system 400 may include two or more implementations that can be operated substantially simultaneously, in parallel, in series, etc. In one implementation, for example, the system 400 may comprise line-of-sight lasers that create a trip-line barrier that allows workers 406 to engage within the work zone. In the other implementation, the system 400 may comprise both laser and Doppler technologies for use based on the situation. A system operating using Doppler technology and, in some instances, the use of lasers can help mitigate the use of cords and/or exposed charging areas, may help with alignments of stations 402, and or may be used to detect objects entering the work-zone.

In some examples, the system 400 can be managed by the personnel 406 using the personnel alerter 412, 912. As an example, the system 400 may be configured to allow users to reset and operate the system 400 using control features disposed on/in the personnel alerter 412, 912. That is, for example, the personal alerter 412 can comprise a reset button to reset the system after an activation; an activation button to initiate or activate the system; or other components that allow for operable modification of the system.

Figure 10A:
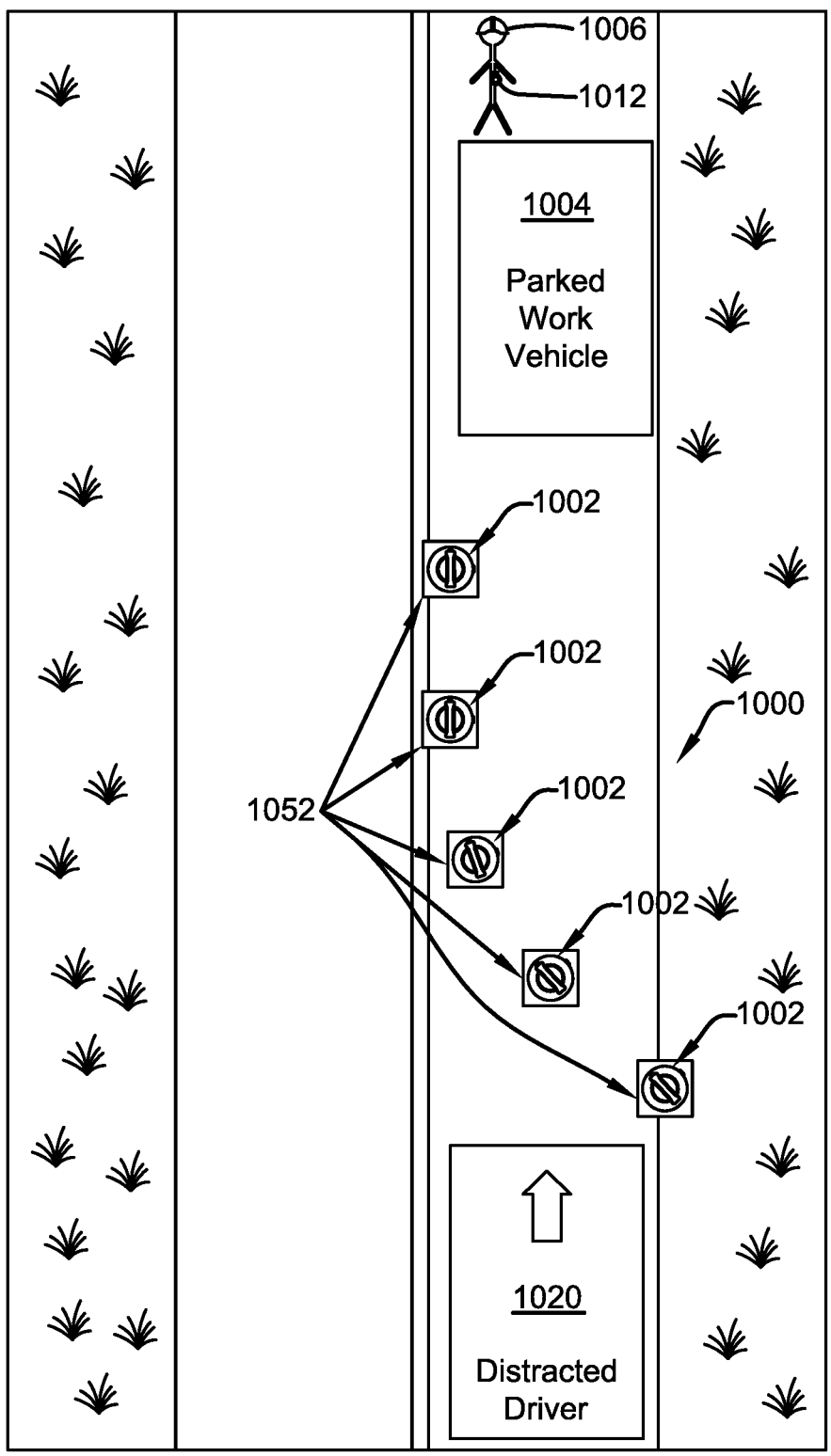
FIGS. 10A through 10C are component diagrams illustrating an example implementation of one or more portions of one or more systems described herein.
Figure 10B:
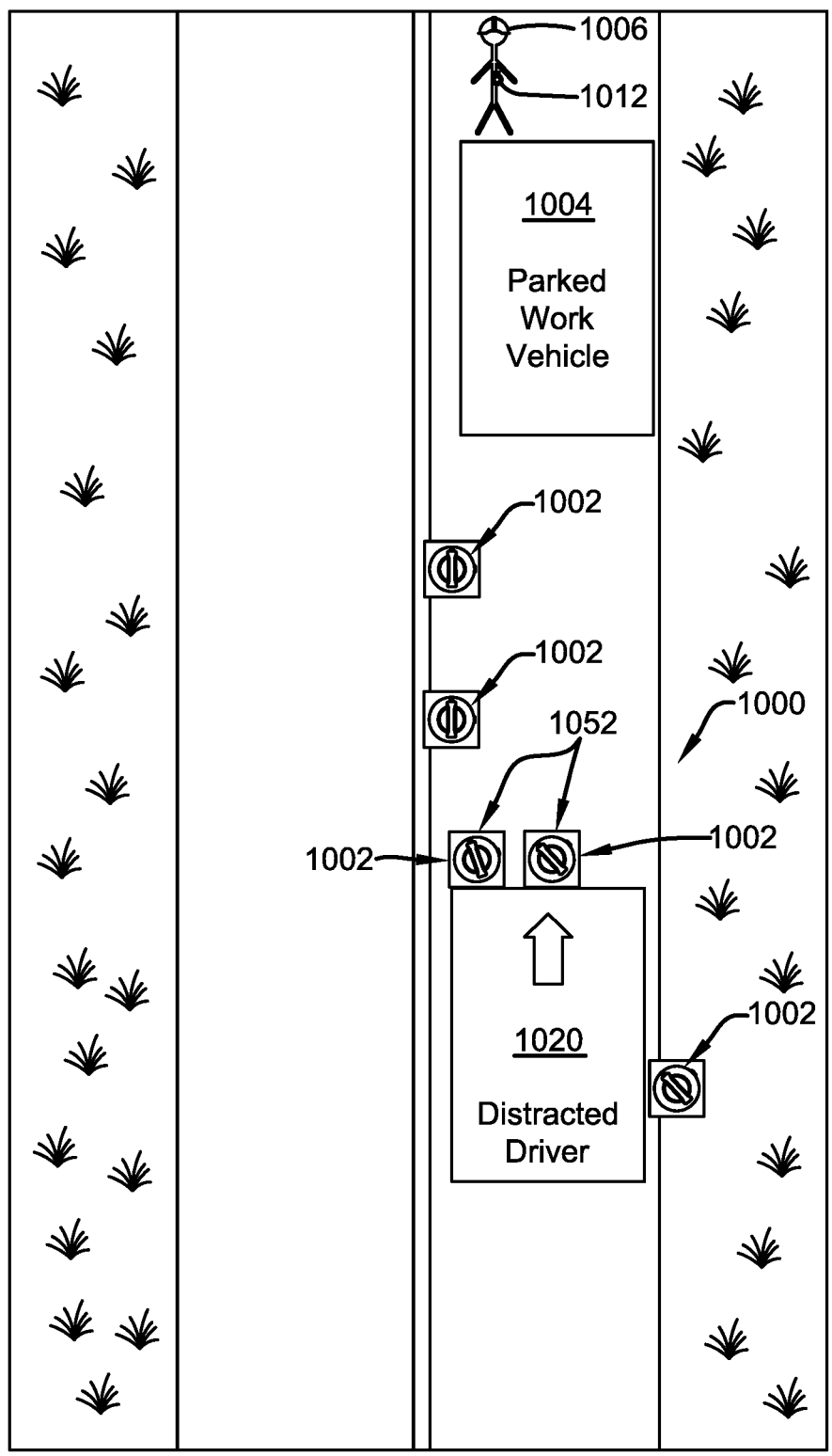
Figure 10C:
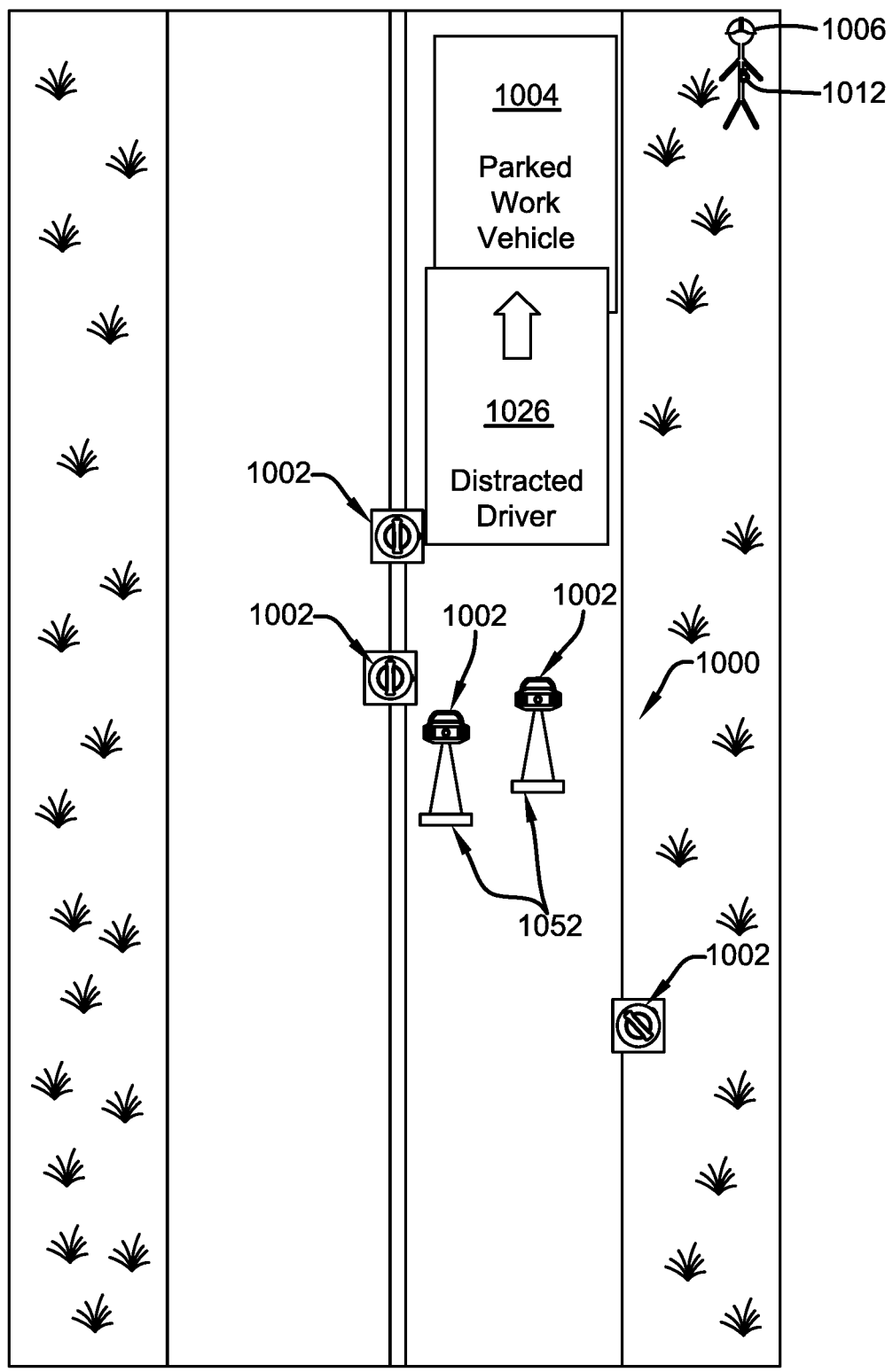

With reference to FIGS. 4 through 9, FIGS. 10A, 10B, and 10C, illustrate an example implementation of one or more portions of one or more systems described herein. As an illustrative example, FIGS. 10A-10C depict a top down view of an example work zone on a single lane road, comprising two sides. Of note, the work zone is not to scale, and a variety of factors, including the speed limit of a road, weather and other factors, can be determinative of the appropriate placement of the work zone boundary markers 1052 behind a work vehicle 1004. In the illustrative implementation of FIG. 10A, a worker 1006, wearing the personnel alerter 1012, is positioned in front of a parked work vehicle 1004, with an example work zone intrusion alarm system 1000, as described herein, set up behind the parked work vehicle 1004. The example work zone intrusion alarm system 1000 comprises detection units 1002 mounted to respective work zone boundary markers 1052. Although not clear in the drawing, the alignment mechanism of one detection unit 1002 points in the direction of another detection unit 1002. Further, a distracted driver 1020 is approaching the demarcated work zone from the bottom.

In the illustrative implementation of FIG. 10B, the distracted driver 1020 has been detected by the detection units 1002 and has made contact with/impacted the work zone boundary markers 1052. The detection unit 1002 activates an alert state. Activation of the alert state can result in the detection unit 1002 providing an alert to the worker 1006, such as an audible siren (e.g., and/or flashing strobe, etc.). At substantially the same time, the wireless transmitter in detection unit 1002 can transmit the alarm signal. Those personnel alerters 1012 that are within range of the transmission can receive the alarm signal, using the receiver of the personnel alerters 1012 (e.g., 930 of FIG. 9). Upon receiving the alarm signal, the personnel alerter 1012 can activate the alerting component 920, such as the speaker of the audio alerter 922 (e.g., or other alerter 924, 926), which can emit an audible alert (e.g. siren). In this way, for example, when both the detection unit's 1002 alert device and the personnel alerter's 912 alerting component 920 activate an alert that is detectable by the worker 1006, the worker 1006 may be appropriately alerted that the work zone perimeter has been breached, possibly by a distracted driver 1020.

In one illustrative implementation, the work zone intrusion alerting system 400 can provide the worker 406 with additional time to move out of the path of an oncoming vehicle in response to the alert. As an example, the distracted driver 1020 may collide with the back of the parked work vehicle 1004. However, in this example, because the worker 1006 was alerted prior to the potential collision, the worker 1006 had additional time to move off the road prior to the impact occurring.

As an illustrative example, a number of detection units 1002 used to set up a work zone boundary can be determined by the speed limit (e.g., or expected speed) for vehicles in the area of the work zone, the terrain, sight lines, weather, and other site circumstances. As an example, table 1 below is one implementation of a number and length of a work zone on a roadway.

TABLE 1

| Speed (mph) | Buffer (feet) | Taper (feet) | Total Length (feet) | # of Cones |
|---|---|---|---|---|
| 20 | 115 | 67 | 182 | 9 |
| 25 | 155 | 104 | 259 | 10 |
| 30 | 200 | 150 | 350 | 12 |
| 35 | 250 | 204 | 454 | 13 |
| 40 | 305 | 267 | 572 | 14 |
| 45 | 360 | 450 | 810 | 18 |
| 50 | 425 | 500 | 925 | 19 |
| 55 | 495 | 550 | 1,045 | 19 |
| 60 | 570 | 600 | 1,170 | 20 |
| 65 | 645 | 650 | 1,295 | 20 |
| 70 | 730 | 700 | 1,430 | 20 |
| 75 | 820 | 750 | 1,570 | 21 |

In this example, a user can determine the size of the buffer zone; as shown in table 1, this is the area that separates the back of the first work vehicle to the end of a transition area. Table 2 below shows the appropriate distance based on the speed limit of the road as a function of speed.

TABLE 2

| Speed* | Distance |
|---|---|
| 20 mph | 115 feet |
| 25 mph | 155 feet |
| 30 mph | 200 feet |
| 35 mph | 250 feet |
| 40 mph | 305 feet |
| 45 mph | 360 feet |
| 50 mph | 425 feet |
| 55 mph | 495 feet |
| 60 mph | 570 feet |

TABLE 2-continued

| Speed* | Distance |
|---|---|
| 65 mph | 645 feet |
| 70 mph | 730 feet |
| 75 mph | 820 feet |

*Posted speed, off-peak 85th-percentile speed prior to work starting, or the anticipated operating speed In this example, workers can determine the size of the transition area that will divert traffic around the work area. Table 3 below shows the calculations used to calculate this area and has two different equations for urban streets and high speed roads. The width (W) is determined by the number of lanes blocked off. A typical lane in the USA is 10 feet wide. If the work zone blocks off one lane, then the width is 10. If two lanes, it is 20 feet.

TABLE 3

| Speed (S) | Taper Length (L) in feet |
|---|---|
| 40 mph or less | $L = \dfrac{WS^2}{60}$ |
| 45 mph or more | $L = WS$ |

Where:
L = taper length in feet
W = width of offset in feet
S = posted speed limit, or off-peak 85th-percentile speed prior to work starting, or the anticipated operating speed in mph In some implementations, the respective detection units 1002 used to demarcate a work-zone boundary may be able to detect objects up to seventy-five feet away. As an example, the Doppler antenna array can be programmatically adjusted to effectively detect objects at a variety of ranges. However, in this example, the effective range to appropriately detect objects, while mitigating false alarms, may be approximately seventy-five feet. Depending on the intended use, such as location and expected speed of the area, the range may be programmatically adjusted to accommodate a shorter range, which may provide improved accuracy and further reduce potential false alarms. That is, for example, as the beam emits from the Doppler array (e.g., at thirteen degrees wide angle), the detection area increases the further away from the detection unit 1002. Therefore, an increase in distance from the detection unit 1002 also increases the detection area, which may result in increased false alarms due to the detection area encroaching outside the work-zone boundary. Therefore, in some implementations, the respective detection units can be programmatically adjusted to have an effective detection range that approximates the distance between markers and detection units 1002.

In some implementations, it is estimated that two cone mounted detection units 1002 may be used for lower speed work zones, for example, and three detection units 1002 may be used for higher speed areas or areas with bends in the road. As an example, a single cone mounted detection unit 1002 can effectively cover 75 feet with its Doppler radar beam. In this example, a user can scale up or scale down the detection range based on the environment, etc., as described above. As an example, a series of cones (e.g., as described above) can be used to demarcate a work-zone boundary, and a detection unit 1002 can be placed on a cone every seventy-five feet (e.g., or less depending on conditions), thereby having one or more cones without detection units 1002 between each unit.

It should be appreciated that a range of a Doppler array disposed in a detection unit 1002 may be two-hundred feet or more. However, in some implementations, an effective range of the detection unit 1002 may be set to approximately one-hundred and twenty feet as a high end detection range. As described above, for example, effective detection may include reduction of false negatives which may occur when the range is extended. In some implementations, respective detection units 1002 may comprise an adjustable setting that allows a user (e.g., or adjustment may be automated based on a preset safety zone setting) to adjust the effective range of the Doppler array. For example, respective Doppler arrays may be adjusted between a fifty foot, 80 foot, and one-hundred and twenty foot range. It should be anticipated that other range setting adjustments may be made available from greater than zero feet up to (e.g., or greater than) two-hundred feet, and any effective distance in between. As another example, an adjustment setting for respective detection units 1002 may allow a user (e.g., or preset setting) to provide infinite adjustment above zero and up to the maximum effective range of the provided Doppler array.

In some implementations, the detection unit 1002 may comprise a button (e.g., or on-screen UI widget) that can be activated (e.g., pushed, touched, or otherwise activated) to adjust the range setting. For example, a first activation of the button may set the range at fifty feet, and second activation may set the range at eighty feet, and a third activation may set the range at one-hundred and twenty feet. In other implementations, the adjustment setting may be adjusted using a knob, switch, or dial. In other implementations, the adjustment setting may be set using an on-screen user interface that allows input of the desired range (e.g., using a user interface), or operation of an on-screen widget. In other implementations, the effective range may be auto-set based on a predetermined configuration of the safety zone (e.g., based on size, scope, circumstances, distances between cones, speed limit, environmental conditions, etc.).

Further, in one aspect the detection unit 1002 may be configured to filter out non-target objects, such that an alert is not provided when a non-target object is detected. That is, for example, the detection units can be configured to detect an object that may provide a safety concern to workers disposed within the safety zone, such as automobiles. A Doppler array may be used to detect the speed, size, and/or direction of travel of an object. As such, in some implementations, the detection unit 1002 may be configured to merely identify objects that meet a predetermined threshold for activation of an alert, based on characteristics of the object detected. As an example, objects that are identified as being smaller that a preset size (e.g., smaller than an automobile—motorcycle, car, truck, etc.) may be filtered out, such as people, animals, etc. Additionally, objects that are travelling below a predetermined threshold speed may be filtered out from an alert activation. As another example, the Doppler array may be able to detect whether an object is moving toward the detection unit 1002 or away from the detection unit 1002. In this example, objects that are moving away from the detection unit may be filtered out from an alert activation.

In another aspect, Doppler arrays can be configured to run at different frequencies. For example, a plurality of Doppler arrays can be each be set to run at different frequencies, such as 10 gigahertz, 9.998 gigahertz, 9.997 gigahertz, and so on. In this way, for example, the respective Doppler arrays deployed in the detection units 1002 may not interfere with each other during operation. For example, the deployment of the respective detection units 1002 in a safety zone may provide for overlapping Doppler beams, at least in part. In this example, using different frequencies may mitigate interference between the overlapping Doppler beams. In some implementations, the frequency used by each detection unit deployed can be set manually, such as by a user, or programmatically by a preset deployment design.

As an example, each detection unit may have a preset frequency that is hard coded during set up (e.g., manufacture). An exemplary detection unit 1002 may comprise a code that identifies the unit's hard-coded frequency. In other implementations, the frequency may be updated at time of deployment, by a user, programmatically, and/or based on detection of already deployed frequencies. That is, for example, at time of activation (e.g., deployment), a first frequency may be set (e.g., by the base unit 404 or detection unit 1002) for a first detection unit. In this example, when a second detection unit is activated (e.g., deployed), a second frequency can be set for the second unit, based on the known setting of the first frequency or based on detection of the first frequency already being in use. In this way, for example, a plurality of detection units 1002 may be activated and deployed, where each is using a different frequency. As another example, when a third unit is activated, the third unit (e.g., or base unit) may send an inquiry to other activated units to identify their frequencies, and the third unit may select a different (third) frequency.

Figure 11B:
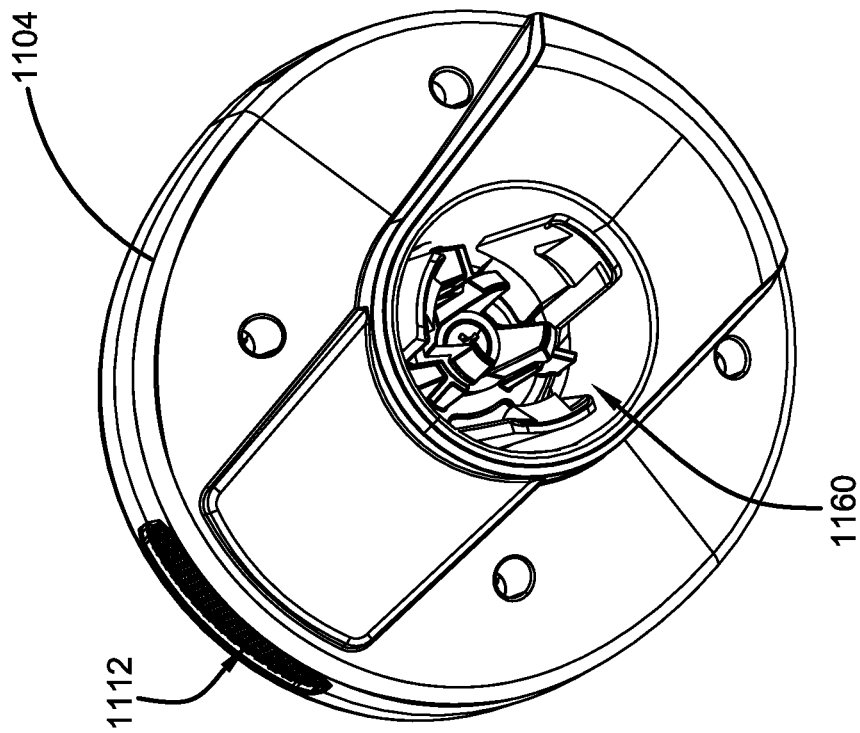
FIGS. 11A through 11F are component diagrams illustrating one or more portions of one or more components of an alternate example detection unit.
Figure 11A:
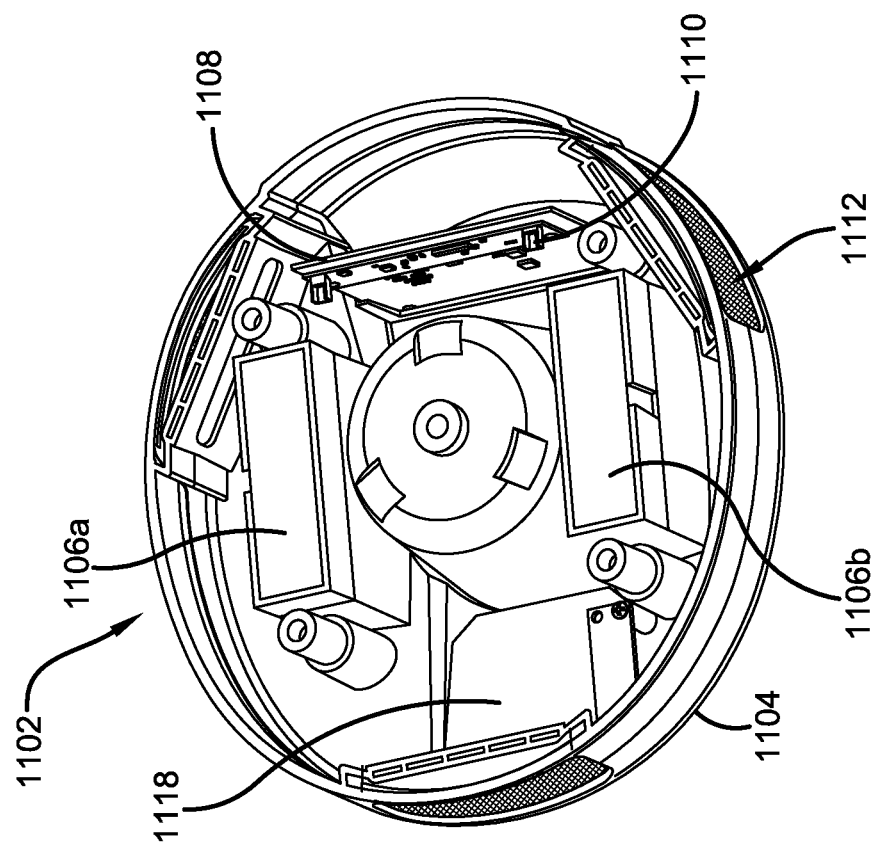
Figure 11C:
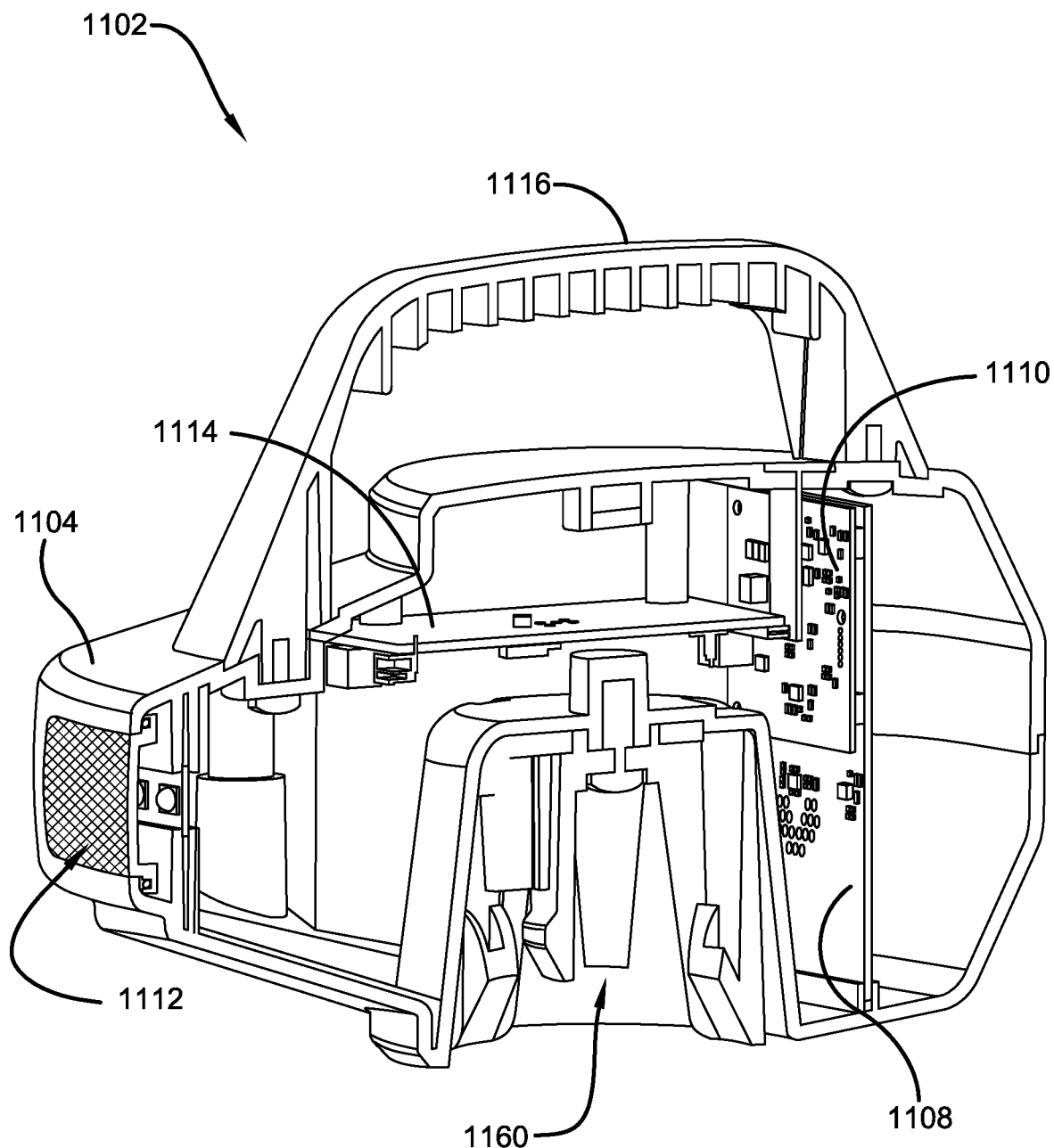

FIGS. 11A, 11B, and 11C are component diagrams illustrating an alternate implementation of a detection station 1102 (e.g., alternate to 402 of FIG. 4). In this implementation, the detection station 1102 can comprise a housing 1104 for housing various components of the detection station 1102. Further, the detection station 1102 can comprise one or more batteries 1106a, 1106b (e.g., for extended power, and/or for power backup, such as up to 16 hours of use, with an additional safety margin) to electrically power the station 1102. A Doppler sensor 1108, such as a Doppler strip array (e.g., antenna array), and a sensor circuit board 1110 can be used to operably detect an object approaching and/or in a work-zone, as described above. In some implementations, the example detection station 1102 can comprise an inductive pick-up coil for receiving wireless power from a complementary charging station, to charge/recharge the batteries 1106a, 1106b.

Figure 11F:
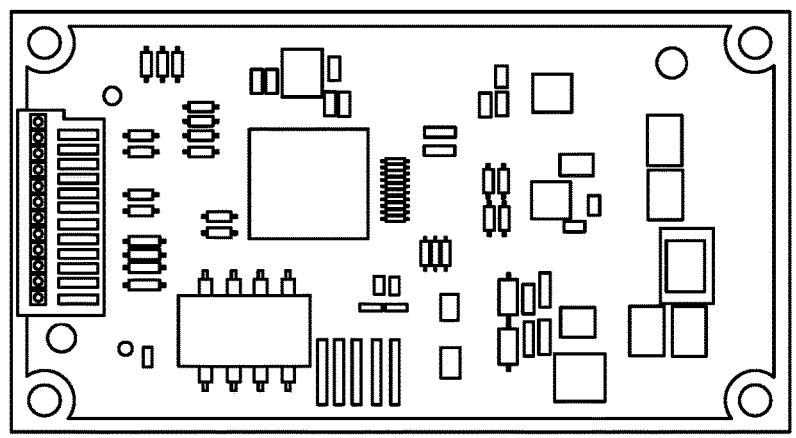
Figure 11D:
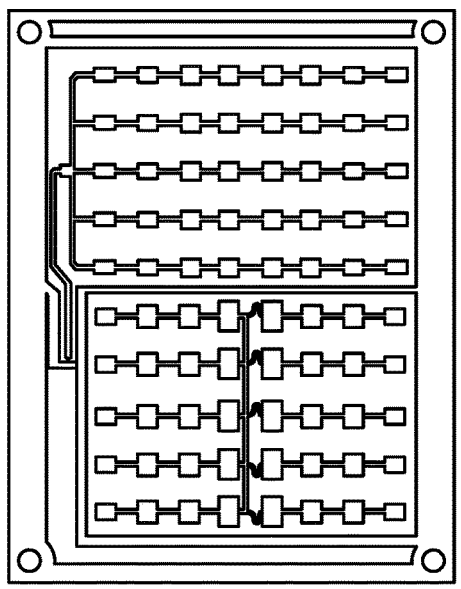
Figure 11E:
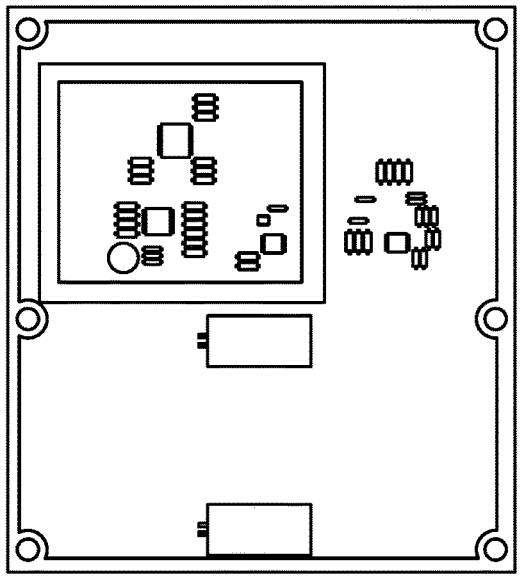

FIGS. 11D, 11E, and 11F are component diagrams that illustrate one example implementation of the Doppler sensor system. In this example, FIG. 11D illustrates the front of the Doppler antenna array 1108, and FIG. 11E illustrates the back side of the Doppler antenna array 1108. Further, a digital signal processing (DSP) board 1110 for the Doppler antenna 1108 is illustrated in FIG. 11F. In this example implementation, the antenna 1108 can comprise a custom microstrip design that is compact, and separates the antenna from the DSP electronics on the DSP board 1110. As one example, the antenna 1108 can be approximately 3.5'×2.9"×0.25" in size; and the DSP board 1110 can be approximately 1.73"×2.9"×0.25" in size. In some implementations, the antenna signal can utilize a 24 GHz signal frequency for Doppler radar detection. In this implementation, the detection range can comprise up to one-hundred and fifty feet to detect objects, such as vehicles and people. In some implementations, the detection radar beam may have an operable angle of approximately thirteen degrees. As one example, a 3.7 VDC lipo battery can be used to power the antenna array at 480 mA.

Returning to FIGS. 11A, 11B, and 11C, an attachment device 1160 can be disposed in the housing 1102 for operable coupling with a boundary marker. A controller circuit board 1114 can be disposed in the housing 1104 for operably determining whether an object has entered the work-zone, the station 1102 has been impacted/moved, and/or to transmit/broadcast an alarm signal on a coupled network, among other things. Additionally, a handle 1116 may be fixedly engaged with the housing to provide for portability. One or more light arrays 1112 can be disposed around the housing to provide visible indications, such as when powered on, and/or when an alert is indicated.

FIGS. 12A, 12B, and 12C are component diagrams that illustrate an alternate attachment device 1160 for coupling a detection unit (e.g., 1102 of FIG. 11) to a work zone boundary marker. In this implementation, the example device 1160 can comprise a first set of engagement fingers 1264 and a second set of engagement fingers 1266. Further, the respective fingers 1264, 1266 can be fixed to a base 1262 to operably extend downward, for example. In this implementation, the first set of fingers 1264 can be configured to operably engage/couple with a first marker 1270, which comprises a first top configuration. Additionally, the second set of fingers 1266 can be configured to operably engage/couple with a second marker 1272, which comprises a second top configuration. That is, for example, a first top configuration may comprise an indentation (e.g., a divot cone top), and the second top configuration may comprise straight walls (e.g., straight top cone). As an example, multiple fingers can aid in operable coupling with a plurality of different types of marker tops.

FIGS. 13A and 13B are component diagrams illustrating an alternate implementation of a personal alerter 1300 (e.g., alternate to 412 of FIG. 8). In this implementation, the personal alerter 1300 can comprise an alerter housing 1302 for housing components, an alerter attachment component 1304, and visible indicator 1306 to provide visual indication of an alert and/or other information. The visible indicator 1306 can comprise a light array 1308 (e.g., comprising LEDs) and an optically clear cover 1310 to provide protection to the light array 1308. The alerter attachment component 1304 can comprise an attachment clip 1318 that can operably couple with personnel clothing, and a retention spring 1320 to operably bias the attachment clip 1318 against the housing 1302 to facilitate securing the alerter 1300 to the personnel.

Further, in this implementation, the alerter 1300 can comprise a control panel 1310 that is used to operate the alerter 1300, such as power button, and other control functions. A control circuit board 1314 can be used to control desired functions of the alerter 1300, such as receiving or transmitting signals, communicatively coupling with other components of the system (e.g., 400), and activating signaling/alerting components of the alerter 1300. The alerter 1300 can comprise a speaker 1316 to provide an audible signal to personnel in a work zone and a sensory alert component 1312 (e.g., vibration motor) to provide a sensory alert to an individual wearing the alerter 1300. The example base station 1400 can comprise a battery 1324 for storing and providing electrical power to the alerter 1300. In some implementations, the portable alerter 1300 can comprise an inductive charging coil 1322 for wirelessly charging the battery 1324.

Figure 14C:
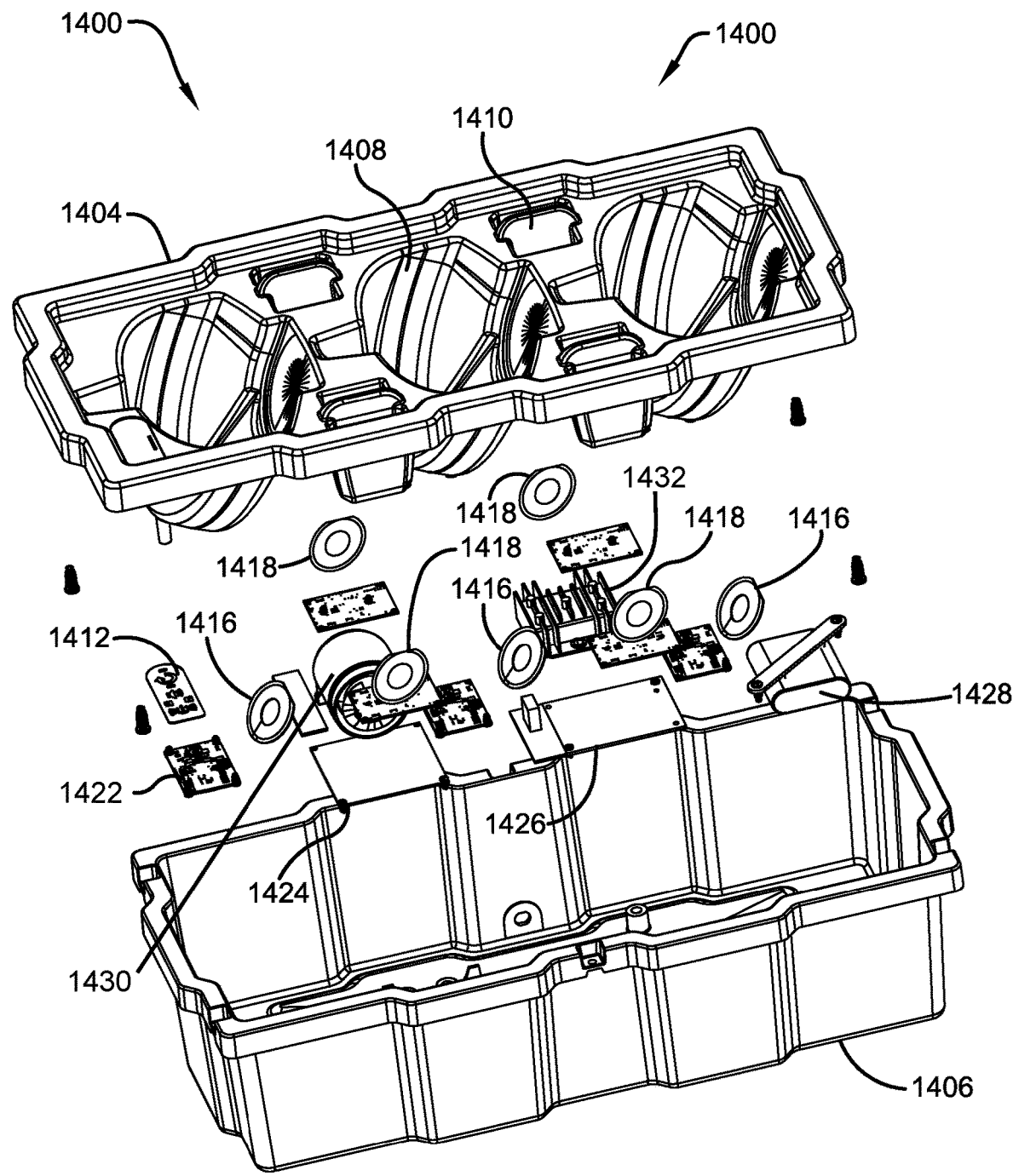

FIGS. 14A, 14B, and 14C are component diagrams illustrating various views of one implementation of a base station. FIG. 14A comprises a top perspective view of a base station 1400 without stowed components; FIG. 14B comprises a side perspective view of a base station 1400 with components stowed; and FIG. 14C comprises a side perspective view of a base station 1400 in exploded view. In this implementation, the base station 1400 comprises a housing 1402 formed by a top section 1404 and a bottom section 1406. The top section 1404 comprises stowage pockets 1408, 1410 for holding stowed components. For example, a first stowage pocket 1408 can be configured to hold a detection station (e.g., 402, 1102) in a stowed position; and a second stowage pocket 1410 can be configured to hold a portable alerter (e.g., 412, 1300) in a stowed position. The housing can be comprised of a suitable polymer, metal, carbon fiber, glass fiber, or other material selected for suitability for intended use. Further, in some implementations, the housing can be formed to create a suitable shape to fit the housing in a target case, to fit target detection stations, and to fit target portable alerters.

In this implementation, the base station 1400 comprises a user interface 1412, which can be used by personnel to operate the base station 1400. For example, the user interface can comprise a panel with physical buttons and/or switches, and/or can comprise a touch enabled screen that allows the user to interact with the base station 1400. As an example, the user interface may allow the user to power on/off the base station 1400, set up a communication network, reset the system, update security protocols, connect with target devices in the system, perform internal health checks, manage recharging operations of a stowed device, and other functions related to operating a managing a work-zone alerting system (e.g., 400). Further, respective first stowage pockets 1408 can comprise a first charging pocket 1414 that is configured to align a wireless charging location of a stowed detection station 1450 with a wireless charging component in the base station 1400.

As illustrated, the base station 1400 is configured to operably stow one or more detections stations 1450, and one or more portable alerters 1452. In this implementation, when in the stowed position, the respective detection stations 1450 and portable alerters 1452 can be selectably charged, either wirelessly or using a charging cord (not shown). Further, the base station 1400 can comprise a first inductive, wireless charging coil 1416 disposed at respective first charging pockets 1414 (e.g., internally), and a second inductive, wireless charging coil 1418 disposed at respective second charging pockets 1420 (e.g., internally). In this implementation, for example, the first charging pocket 1414 can align a complementary inductive charging coil disposed in the detection station (e.g., 1118 of 1102) with the first inductive, wireless charging coil 1416 disposed in the base station 1400 to provide for wireless charging of the detection station (e.g., 1102) when stowed. Additionally, for example, the second charging pocket 1420 can align a complementary inductive charging coil disposed in the portable alerter (e.g., 1322 of 1300) with the second inductive, wireless charging coil 1418 disposed in the base station 1400 to provide for wireless charging of the portable alerter (e.g., 1300) when stowed.

In this implementation, the base station 1400 can comprise one or more charging control circuit boards 1422, which are respectively electrically coupled with a corresponding charging coil 1416, 1418, to control the wireless charging of a coupled device. Further, one or more station control circuit boards 1424 can be used to control various functions of the base station 1400, and may comprise a processor, memory, one or more alerter controls (e.g., for sound, light control), communications components (e.g., BLE device) for network connectivity, and other components. Additionally, the base station 1400 can comprise one or more light arrays to provide visual alerts, and one or more sound devices (e.g., speakers) to provide auditory alerts. In some implementations, the base station 1400 can comprise a battery 1428 and a control circuit board 1426, and a power converter unit 1432. In these implementations, the battery 1428 can store and provide electrical power to the base station 1400, the power control circuit board 1426 can control power use and charging of the battery 1428, and the power converter unit 1432 can transform incoming power (e.g., from an electrical outlet) into electrical power that can be used for recharging, and/or operating the base station 1400.

Further, as illustrated, the example base station 1400 can comprise an inductive charging control board 1422 for respective inductive charging coils 1416, 1418. In this example, the respective inductive charging stations can be controlled by the accompanying inductive charging control board 1422. Additionally, the example base station 1400 comprise an audible alarm 1430 (e.g., siren), which can be activated when an alert signal is indicated, to provide an audible alarm to proximate workers. In this example, the base station 1400 can comprise a near-field communication reader 1424, such as an radio-frequency identification (RFID) reader. In this example, the reader 1424 can be activated to read a near-field signal from a proximate device, such as to identify an RFID tag in/on a device to add the device to a communication network with the base station 1400.

Figure 15:
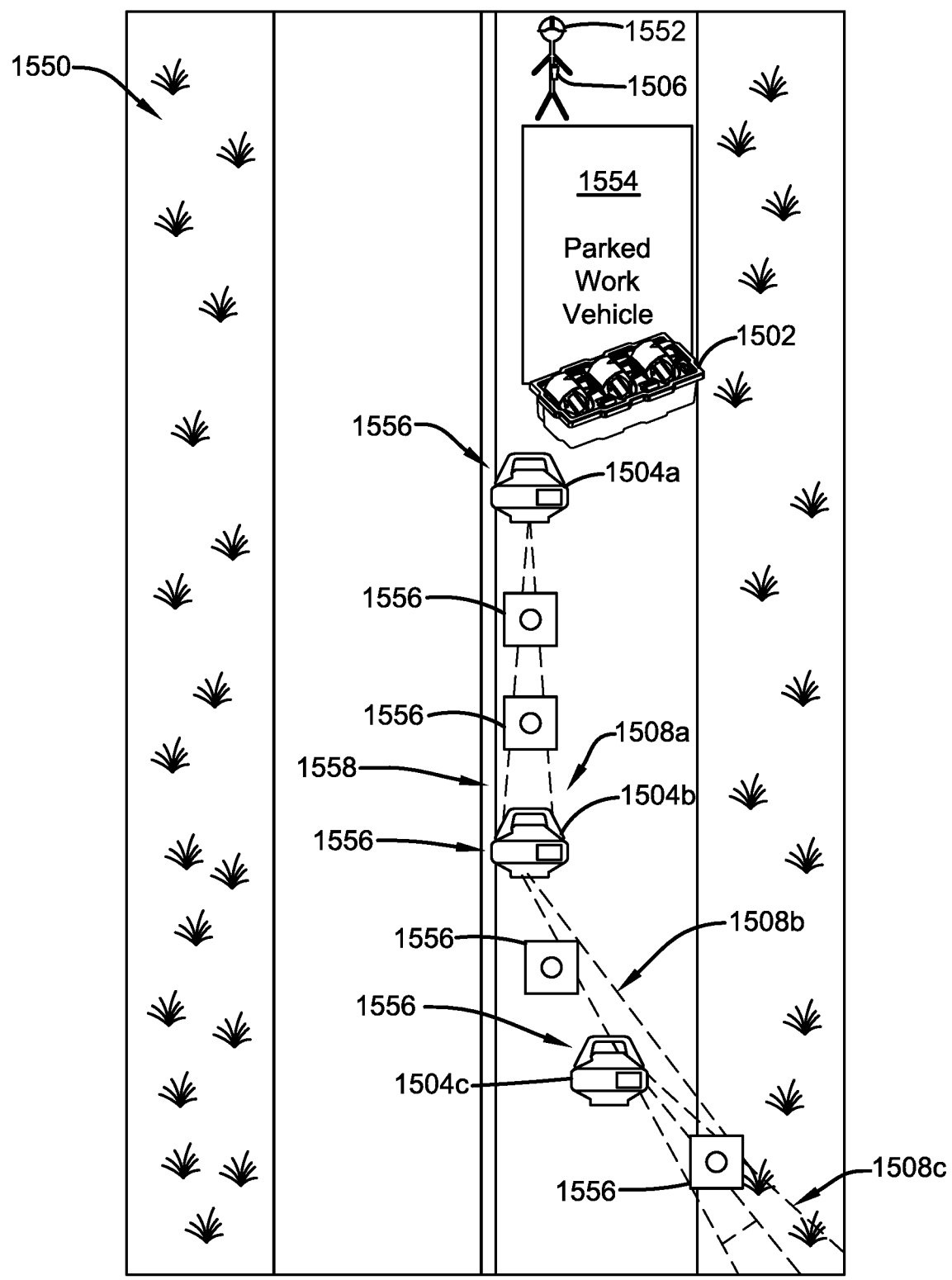
FIG. 15 is a component diagram illustrating an example implementation of one or more portions of one or more systems described herein.

As an illustrative example, FIG. 15 is a component diagram illustrating one implementation of a work zone set up, using one or more portions of the systems described herein. As illustrated, an approach to a work zone (e.g., a roadway) can be at least partially delineated by a boundary 1558 as determined by the workers 1552 in the work zone 1550. In this example, the approach boundary 1558 can be delineated by a plurality of boundary markers 1556, such as cones, barrels, and the like, in accordance with best practices (e.g., described above). Further, a work vehicle 1554 is parked in the work zone 1550 down road from the delineated approach boundary 1558. One or more workers 1552 may be stationed in the work zone 1550 respectively having (e.g., wearing) a personal alerter 1506 (e.g., 412, 1300).

In this example, a base station 1502 (e.g., 404, 1400) can be positioned on or proximate the work vehicle 1554 (if present), or at a location down road from the delineated approach boundary 1558. Further, a plurality of detection stations 1504a, 1504b, 1504c (e.g., 402, 1102), can be deployed along the boundary 1558. In this example, seven boundary markers 1556 have been deployed (e.g., based on the conditions), and a first detection station 1504a is engaged with the first boundary marker; a second detection station 1504b has is engaged with the fourth boundary marker; and a third detection station 1504c is engaged with the sixth boundary marker. As an example, a number and position of the deployment of the respective detection stations 1504 can be determined by the length of the approach boundary 1558 and the number of boundary markers 1556.

In this example, respective detection stations 1504 may have an effective detection range according to the effective range of the radar cone 1508 produced by the detection station 1504. As illustrated, the second detection station 1504b is deployed within the effective range of a first radar cone 1508a; the third detection station 1504c is deployed within the effective range of a second radar cone 1508b; and a third radar cone 1508c has an effective range that at least reaches the end of the approach boundary 1558. In this way, for example, the approach boundary 1558 can be effectively covered by the detection stations 1504. It will be appreciated that any appropriate configuration of deployment of detection stations 1504 and boundary markers 1556 may be utilized. For example, in a shorter approach boundary, merely two detection stations may be deployed; and in a longer approach boundary, four or more detection stations may be deployed.

In some implementations, the base station (e.g., and/or the respective detection stations, and portable alerters) can be configured to provide security in the communication network used by the respective devices in a system (e.g., 400). For example, the base station 404, 1400 can be configured to communicatively couple with one or more detection stations 402, 1102 and one or more portable alerters 412, 1300, such as to create a mesh network. In this example, BLE communication modules (e.g., or other suitable low power short-range communication modules) can be disposed in the respective devices in the network, and used to set up communications between respective devices. In some implementations, a security code or key can be used to enable connection between devices, such that only a device that has or knows the key can couple with the mesh network. As an example, the security code or key may be changed or updated (e.g., to avert a security breach) as needed or automatically, and shared between linked devices. In some implementations, the base station can be configured to reset the key or code, for example, upon receiving a command triggered by a user interface (e.g., 1412). In this example, the respective devices on the system can update their keys to match that of the new code for the communication network.

In some implementations, near-field communication equipment and techniques may be used to establish communication between one or more portions of the system. As one example, RFID equipment may be used to establish communication, and provide security in joining devices to a communications network for the system. For example, an RFID can be disposed in one or more pieces of the system (e.g., detection station, personal alerter, base station), where the tag consists of a radio transponder (e.g., a radio receiver and transmitter). In this example, the tag can be interrogated by an electromagnetic interrogation pulse from a nearby RFID reader device (e.g., disposed in the base station); and the tag can transmit a signal comprising digital data that identifies the device. In this way, the base station may be able to identify one or more detection stations 402, 1102 and one or more portable alerters 412, 1300, to determine that they are authorized, in order to securely set up a mesh network, or otherwise establish communications. As an example, the base station 404, 1400 may be powered, and an RFID scanner activated. In this example, each detection station 402, 1102 and portable alerters 412, 1300 used in the system (e.g., 400) can be scanned to establish communication with the base station 404, 1400, and/or respective devices 402, 1102, 412, 1300.

In some implementations, communication between respective devices in a deployed system may be encrypted. That is, for example, the mesh network or other communication network may be encrypted to mitigate intrusion by malicious (e.g., or unintentional) actors. In an illustrative example, components that link to an example communication network (e.g., personal area network, mesh network, near-field network, or other wireless, close-range communication network) can comprise the base station (e.g., 404, 1400), the one or more detection stations (e.g., 402, 1102), and the one or more portable alerters (e.g., 412, 1300). In this example, the network can be initiated by the base station, where each network (e.g., each different base station) can comprise a network ID that is particular to that network (e.g., and base station). Further, respective devices that can or do couple with the network can store the particular network ID in internal memory (e.g., non-volatile). In this way, for example, the particular network ID that matches with the base station's network ID can identify which network the device may belong to (e.g., and communicate with). As one example, the network ID can be a 64-bit value that is composed of a 48-bit base station device ID, and a 16-bit randomly-generated value. In this example, there may merely be one base station for each different communications network.

In one example of pairing, the charging base can be preset (e.g., factory set, or subsequent reset) with a particular network ID. Further, prior to initial pairing, the other devices (e.g., detection station, portable alerter) may have no network ID stored in memory. In this example, initial pairing can add a device to the network by providing a target device with the particular network ID of a target base station. In this example, the base station can be disposed in pairing mode, and the target device can be disposed in paring mode, and the base station can communicate the particular network ID to the target device, and the target device can store the particular network ID in their internal memory. In this way, for example, the target device can be placed in the communications network with the base station. This process can be iterated for additional devices for the particular communications network, for the target base station.

As one illustrative example, during typical operations for a particular communications network (e.g., when not in pairing mode), respective devices that are coupled with the network can perform two (e.g., or more) communication operations relatively simultaneously (e.g., or asynchronously). In this example, respective devices can broadcast advertising messages to the network (e.g., any one or more of the devices coupled to the network); and scan for advertising messages from the network (e.g., any one or more of the devices coupled to the network). As an example, respective advertising messages from a device can comprise one or more of the following:

- A particular unique universal ID (UUID), which is particular to the user (e.g., organization, company, person using the device(s)). This UUID can be used to identify friendly or allowed devices, and disallow any other unfriendly or unauthorized (e.g., generic) network devices (e.g., Bluetooth);
- A network ID, which can be the ID of the network that the device(s) belong to;
- A device ID, which can be the device that is broadcasting the message;
- The device type—base station, detection station, or portable alerter;
- An alarm notice, can indicate whether the sending device has an active alarm;
- A build number of the firmware version running on the sender device; and
- The operation mode of the device, which may be normal or pairing.

In some implementations, a pairing procedure can allow a target device (e.g., detection station, portable alerter) to join a network created by a target base station. For example, this procedure can allow the target device to obtain a network ID from the base station. In one implementation, the pairing can be initiated by disposing the target device proximate the target base station, such as proximate an RFID reader on/in the base station. In this example, the RFID reader can read the device ID of the target device, and enter the base station into pairing mode, which results in the base station broadcasting a paring mode advertising, which includes the target device ID that the base station received from the RFID reader.

In this example, the target device can receive the pairing mode advertising message, and verify that the message includes the particular user UUID, and that it is a pairing mode message. Further, the device can compare the device ID in the message to its own device ID; and, if they match, the target device can open a communication connection (e.g., Bluetooth) with the target base station. Additionally, in this example, once a communication coupling is in place between the target device and target base station, the base station can write/send the particular network ID for the target device, and the connection may be closed. The target device can store the particular network ID to its memory, and any subsequent device advertising message can include the particular network ID. Therefore, in this example, when the target base station receives an advertising message from the target device including the particular network ID, the base station can validate the message and/or the pairing procedure has occurred appropriately.

In some implementations, a device may be removed from the communication network in one or more ways. For example, the device may simply be powered off in order to remove it from the network. As another example, the target device may be successfully paired with a different base station in order to remove it from the pairing with the prior communication network or base station. In some implementations, a communication network can be reset, for example, to generate a new network ID value. For example, a new 16-bit randomly generated value can be generated and added to the 48-bit base station device ID, to generate a newly generated value for the 64-bit network ID value. In this example, any devices that were coupled to the communication network prior to network reset may not be able to locate the base station with a new network ID, and may enter a network incomplete mode. In this example, the respective devices may need to go through the pairing process again in order to join a communication network with the reset base station.

In some implementations, the light array can provide visual indications of the system (e.g., 400) status. For example, when devices in the system are paired together, with the base station, etc. the light array can provide different colors and/or levels of strobe/intensity to indicate status. For example, a blue LED may remain off when a device is stand-alone (e.g. not connected), or merely a base station is coupled with the portable alerter(s) 412. Further as an example, a blinking blue LED with a blinking yellow RGB LED may indicate absence of a base station (e.g., only detection station 402, 1102 and portable alerters 412, 1300 used in the system), or only one detection station 402, 1102 is present. Additionally, a blinking blue LED may indicate at least two detection stations 402, 1102 are present and coupled. Another indication, such as a blinking magenta RGB LED, along with the blue LED, may indicate that an intruder (e.g., non-secure) device is attempting to join the network. It should be apparent that other or different combinations of lighting presentations can be used to indicate various situations.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for alerting personnel proximate a work zone to a work zone intrusion, comprising:
   a detection unit comprising:
      a body that is operable to mount to a work zone boundary marker; and
      at least one Doppler sensor that transmits and receives a radar signal to detect a moving object in the vicinity of the work zone using the Doppler effect;
   a base station communicatively coupled with the detection unit and configured to operably electrically charge the detection unit; and
   a personnel alerter comprising a portable body, the personnel alerter receiving an alarm signal from one or more of the detection unit and the base station, resulting in the personnel alerter activating an alert;
   wherein the detection unit transmits the alarm signal upon detection of the moving object.

2. The system of claim 1, wherein the detection unit, personnel alerter, and base station are arranged in a mesh network and communicate with each other wirelessly.

3. The system of claim 2, wherein at least one of the detection unit and the base station is configured to activate an alert.

4. The system of claim 3, wherein the detection unit, base station, and personnel alerter respectively act as a receiver and as a repeater so that detection of the moving object in the vicinity of the work zone activates the alert by each of the detection unit, base station, and personnel alerter.

5. The system of claim 3, wherein the alert may comprise one or more of a visual alert, audible alert, and sensory alert.

6. The system of claim 5, wherein the sensory alert is a vibrational alert that is selectably programmable to vibrate.

7. The system of claim 1, the detection unit further comprising one or more of:
   a battery to provide electrical power;
   an alert device configured to activate an alert upon detection of the moving object;
   a transmitter configured to transmit the alarm signal upon detection of the moving object;
   at least one processing device configured to evaluate data related to detection of the moving object in the vicinity of the work zone, wherein the at least one processing device is operatively connected to the alert device; and
   at least one software module comprising code configured to evaluate the moving object to estimate the probability of a work zone intrusion based on proximity of the moving object to the work zone and direction of travel of the moving object of the moving object,
   wherein the at least one processing device and the alert device are configured to activate the alert in the event the processing device and/or software module detects a probable work zone intrusion by the moving object.

8. The system of claim 1, wherein the Doppler sensor is configured to detect one or more of a velocity of the moving object, a distance to the moving object, and a presence of the moving object in the work zone.

9. The system of claim 8, wherein the detection unit further comprises at least one additional sensor to detect one or more of: a presence of metal objects in the work zone; movement between work zone boundary markers; work zone boundary marker tilt, vibration, shock, or freefall.

10. The system of claim 9, wherein the at least one additional sensor comprises one of a magnetic sensor, an optical sensor, and a motion sensor.

11. The system of claim 1, wherein the detection unit further comprises an alignment mechanism which indicates a direction the Doppler sensor monitors.

12. The system of claim 11, wherein the alignment mechanism of the detection unit points in the direction of a second detection unit to align the detection unit and second detection unit to collectively cover the work zone.

13. The system of claim 1, wherein the personnel alerter is a wearable device operable to attach to a worker.

14. The system of claim 13, the personnel alerter comprising one or more of:
   a personnel alerter battery to provide electrical power;
   an engagement component configured to secure the personnel alerter to an article of clothing on the worker;
   at least one of an audio alerter, visual alerter, and sensory alerter; and
   a wireless receiver that receives the alarm signal from one or more of the detection unit and the base station.

15. A system for alerting personnel proximate a work zone to a work zone intrusion, comprising:
a detection unit comprising:
a body that is operable to mount to a work zone boundary marker; and
at least one Doppler sensor that transmits and receives radar signal to detect one or more of a velocity of the moving object, a distance to the moving object, and a presence of the moving object in the work zone using the Doppler effect;
a base station communicatively coupled with the detection unit and configured to operably electrically charge the detection unit; and
a personnel alerter comprising a portable body, the personnel alerter receiving an alarm signal from one or more of the detection unit and the base station, resulting in the personnel alerter activating an alert;
wherein the detection unit transmits the alarm signal upon detection of the moving object,
wherein the detection unit, personnel alerter, and base station are arranged in a mesh network and communicate with each other wirelessly such that the detection unit, base station, and personnel alerter each act as a receiver and as a repeater whereby detection of a moving object in the vicinity of the work zone activates the alert by each of the detection unit, base station, and personnel alerter.

16. The system of claim 15, wherein the alert comprises one or more of a visual alert, audible alert, and sensory alert.

17. The system of claim 15, the detection unit further comprising:
a battery to provide electrical power;
an alert device configured to activate an alert upon detection of the moving object;
a transmitter configured to transmit the alarm signal upon detection of the moving object;
at least one processing device configured to evaluate data related to detection of the moving object in the vicinity of the work zone, wherein the at least one processing device is operatively connected to the alert device; and
at least one software module comprising code configured to evaluate the moving object to estimate the probability and/or severity of a work zone intrusion based on proximity of the moving object to the work zone, direction of travel of the moving object, and speed of the moving object,
wherein the at least one processing device and the alert device are configured to activate the alert in the event the processing device and/or software module detects a probable work zone intrusion by the moving object.

18. The system of claim 15, wherein the personnel alerter is a wearable device comprising:
a personnel alerter battery to provide electrical power;
an engagement component configured to secure the personnel alerter to an article of clothing on the worker;
at least one of an audio alerter, visual alerter, and sensory alerter; and
a wireless receiver that receives the alarm signal from one or more of the detection unit and the base station.

19. A method for alerting personnel proximate a work zone to a work zone intrusion, comprising:
arranging a detection unit, personnel alerter, and a base station in a mesh network in wireless communication;
mounting a detection unit on a work zone boundary marker, the detection unit comprising:
a body that is operable to mount to a work zone boundary marker; and
at least one Doppler sensor configured to detect one or more of a presence of a moving object in a vicinity of the work zone, a velocity of a moving object in the work zone, and a distance to the moving object using the Doppler effect;
communicatively coupling a base station with the detection unit, the base station configured to operably electrically charge the detection unit;
monitoring the work zone with the detection unit for the moving object;
transmitting, upon detection of the moving object, an alarm signal from the detection unit to at least one of the personnel alerter and the base station;
activating an alert, by the personnel alerter, upon receiving the alarm signal from one or more of the detection unit and the base station, the personnel alerter comprising a portable body.

20. The system of claim 19, wherein the alert may comprise one or more of a visual alert, audible alert, or sensory alert.

* * * * *